(12) United States Patent  
Iwasaki

(10) Patent No.: US 9,778,511 B2
(45) Date of Patent: Oct. 3, 2017

(54) LIQUID CRYSTAL DISPLAY DEVICE

(71) Applicant: FUJIFILM Corporation, Tokyo (JP)

(72) Inventor: Tatsuya Iwasaki, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 539 days.

(21) Appl. No.: 14/444,414

(22) Filed: Jul. 28, 2014

(65) Prior Publication Data

US 2015/0036086 A1 Feb. 5, 2015

(30) Foreign Application Priority Data

Aug. 1, 2013 (JP) ................................ 2013-160485

(51) Int. Cl.
| *G02F 1/1335* | (2006.01) |
| *G02F 1/141* | (2006.01) |
| *G02F 1/13363* | (2006.01) |
| *G02F 1/1337* | (2006.01) |

(52) U.S. Cl.
CPC .. *G02F 1/133632* (2013.01); *G02F 1/133528* (2013.01); *G02F 1/133634* (2013.01); *G02F 2001/133738* (2013.01); *G02F 2413/13* (2013.01)

(58) Field of Classification Search
CPC combination set(s) only.
See application file for complete search history.

(56) References Cited

U.S. PATENT DOCUMENTS

| 6,937,308 B2 | 8/2005 | Ishikawa et al. |
| 7,289,179 B2 | 10/2007 | Chang et al. |
| 7,605,884 B2 | 10/2009 | Chang et al. |
| 7,719,647 B2 | 5/2010 | Kajita et al. |
| 8,094,262 B2 | 1/2012 | Chang et al. |
| 2004/0017532 A1 | 1/2004 | Ishikawa et al. |

(Continued)

FOREIGN PATENT DOCUMENTS

| JP | 2002-055341 A | 2/2002 |
| JP | 2004-094219 A | 3/2004 |

(Continued)

OTHER PUBLICATIONS

Notification of Reasons for Refusal issued by the Japanese Patent Office on Aug. 9, 2016, in connection with Japanese Patent Application No. 2013-160485.

*Primary Examiner* — Wen-Ying P Chen
(74) *Attorney, Agent, or Firm* — Edwards Neils LLC; Jean C. Edwards, Esq.

(57) ABSTRACT

A liquid crystal display device: includes: a first polarizer; a liquid crystal cell including a liquid crystal layer containing liquid crystal molecules aligned in parallel with a substrate of the liquid crystal cell; a first compensation film; and a second polarizer, wherein, as viewed perpendicularly to the substrate, an absorption axis of the first polarizer is parallel with an optical axis of the first compensation film, and an angle φ between the absorption axis of the first polarizer and an optical axis of the liquid crystal layer satisfies 0°<φ, in a cross section of the liquid crystal cell as viewed along a transmission axis of the first polarizer, an optical axis of the liquid crystal layer and the optical axis of the first compensation film have a tilt angle in the same direction to a face of the substrate, and the first compensation film has a positive birefringence.

15 Claims, 5 Drawing Sheets

(56) References Cited

U.S. PATENT DOCUMENTS

| | | |
|---|---|---|
| 2004/0090578 A1 | 5/2004 | Chang et al. |
| 2005/0110933 A1* | 5/2005 | Jeon .................. G02F 1/133634 349/141 |
| 2005/0200780 A1* | 9/2005 | Ito ...................... C09K 19/3001 349/118 |
| 2006/0176424 A1 | 8/2006 | Kajita et al. |
| 2007/0091228 A1* | 4/2007 | Itadani .............. G02F 1/133528 349/96 |
| 2008/0129932 A1 | 6/2008 | Chang et al. |
| 2010/0060828 A1 | 3/2010 | Chang et al. |

FOREIGN PATENT DOCUMENTS

| | | |
|---|---|---|
| JP | 2004-163939 A | 6/2004 |
| JP | 2006-220680 A | 8/2008 |

\* cited by examiner

LIQUID CRYSTAL DISPLAY DEVICE

CROSS-REFERENCE TO RELATED APPLICATIONS

The present application claims priority under 35 U.S.C. §119 to Japanese Patent Application No. 2013-160485, filed on Aug. 1, 2013. Each of the above application is hereby expressly incorporated by reference, in its entirety, into the present application.

TECHNICAL FIELD

The present invention relates to an IPS-mode liquid crystal display device.

BACKGROUND ART

Recent interest has focused on liquid crystal display devices of a horizontal electric field mode, such as an in-plane switching (IPS) mode and a fringe field switching (FFS) mode, which have excellent viewing angle characteristics. IPS-mode liquid crystal display devices have viewing angle characteristics superior to those of twisted-nematic-mode (TN-mode) and vertical-alignment-mode (VA-mode) liquid crystal display devices, as disclosed in Japanese Unexamined Patent Application Publication No. 2002-55341, for example. Such an advantage derives from the parallel alignment of liquid crystal molecules to the substrate of an IPS-mode or FFS-mode liquid crystal cell. Unfortunately, the liquid crystal molecules in the IPS-mode liquid crystal cell are not exactly parallel with the substrate, as disclosed in Japanese Unexamined Patent Application Publication Nos. 2002-55341 and 2004-94219. In specific, the long axes of the liquid crystal molecules are tilted in the thickness direction at a tilt angle (inclination angle) from the substrate, in particular, near the substrate surface. Such a tilted alignment of the liquid crystal molecules adversely affects the viewing angle characteristics.

Japanese Unexamined Patent Application Publication No. 2002-55341 discloses a birefringent film between a substrate of a liquid crystal cell and a polarizing plate, which has an optical anisotropy having the opposite sign to that of liquid crystal molecules in the liquid crystal cell and has an optical axis tilted in the same direction as the tilt angle of the liquid crystal molecules, to prevent light leakage when viewed from an oblique direction. Japanese Unexamined Patent Application Publication No. 2004-94219 discloses a positively birefringent material to prevent light leakage when viewed from an oblique direction.

SUMMARY OF INVENTION

Technical Problem

Unfortunately, studies by the present inventors have revealed that the tilt angle of the liquid crystal molecules in the IPS-mode or FFS-mode liquid crystal layer from the substrate causes differences in tint when viewed from above and below (in parallel with the optical axis of the liquid crystal cell) and from the right and left sides (perpendicularly to the optical axis of the liquid crystal cell) in a halftone display mode. In more specific, such differences were observed in a red color in a view from above, a yellow color in a view from the right or left side, and a blue color in a view from below. An object of the invention is to provide a liquid crystal display device that can suppress asymmetry of display of tint depending viewing direction in the halftone display mode.

Solution to Problem

Through intensive studies, the inventors have found that a compensation film disposed between a polarizer and a liquid crystal cell and having a positive birefringence can solve the problems. The absorption axis of the polarizer is parallel with the optical axis of the compensation film. An angle $\phi$ between the absorption axis of the first polarizer and an optical axis of the liquid crystal layer in the liquid crystal cell satisfies $0°<\phi$. As viewed along the transmission axis of the polarizer, the optical axis of the liquid crystal layer in the liquid crystal cell and the optical axis of the compensation film have a tilt angle in the same direction to a face of the substrate of the liquid crystal cell.

Specifically, the problems were solved by the configuration <1>, preferably by configurations <2> to <25> below.

<1> A liquid crystal display device comprising, in sequence:
 a first polarizer;
 a liquid crystal cell comprising a liquid crystal layer containing liquid crystal molecules aligned in parallel with a substrate of the liquid crystal cell; and
 a second polarizer,
 the liquid crystal display device further comprising a first compensation film between the first polarizer and the liquid crystal cell, or between the liquid crystal cell and the second polarizer, wherein
 as viewed perpendicularly to the substrate of the liquid crystal cell, an absorption axis of the first polarizer is parallel with an optical axis of the first compensation film, and the absorption axis of the first polarizer defines an angle $\phi$ ($0°<\phi$) from an optical axis of the liquid crystal layer in the liquid crystal cell,
 in a cross section of the liquid crystal cell as viewed along a transmission axis of the first polarizer, the optical axis of the liquid crystal layer in the liquid crystal cell and the optical axis of the first compensation film are tilted at a tilt angle in the same direction from a plane parallel with the substrate of the liquid crystal cell, and
 the first compensation film has a positive birefringence.

<2> A liquid crystal display device comprising, in sequence:
 a first polarizer;
 a first compensation film;
 a liquid crystal cell comprising a liquid crystal layer containing liquid crystal molecules aligned in parallel with a substrate of the liquid crystal cell; and
 a second polarizer, wherein
 as viewed perpendicularly to the substrate of the liquid crystal cell, an absorption axis of the first polarizer is parallel with an optical axis of the first compensation film, and the absorption axis of the first polarizer defines an angle $\phi$ ($0°<\phi$) from an optical axis of the liquid crystal layer in the liquid crystal cell,
 in a cross section of the liquid crystal cell as viewed along a transmission axis of the first polarizer, the optical axis of the liquid crystal layer in the liquid crystal cell and the optical axis of the first compensation film are tilted at a tilt angle in the same direction from a plane parallel with the substrate of the liquid crystal cell, and
 the first compensation film has a positive birefringence.

<3> A liquid crystal display device comprising, in sequence:
  a first polarizer;
  a liquid crystal cell comprising a liquid crystal layer containing liquid crystal molecules aligned in parallel with a substrate of the liquid crystal cell;
  a first compensation film; and
  a second polarizer,
wherein
  as viewed perpendicularly to the substrate of the liquid crystal cell, an absorption axis of the first polarizer is parallel with an optical axis of the first compensation film, and the absorption axis of the first polarizer defines an angle φ (0°<φ) from an optical axis of the liquid crystal layer in the liquid crystal cell,
  in a cross section of the liquid crystal cell as viewed along a transmission axis of the first polarizer, the optical axis of the liquid crystal layer in the liquid crystal cell and the optical axis of the first compensation film are tilted at a tilt angle in the same direction from a plane parallel with the substrate of the liquid crystal cell, and
  the first compensation film has a positive birefringence.
<4> The liquid crystal display device according to any one of <1> to <3>, wherein the angle φ between the absorption axis of the first polarizer and an optical axis of the liquid crystal layer in the liquid crystal cell is within a range of 0°<φ≤45°.
<5> The liquid crystal display device according to any one of <1> to <4>, wherein the liquid crystal layer in the liquid crystal cell has regions having an optical axis deviating rightward from the absorption axis of the first polarizer and regions having an optical axis deviating leftward from the absorption axis of the first polarizer, as viewed perpendicularly to the substrate of the liquid crystal cell.
<6> The liquid crystal display device according to any one of <1> to <7>, wherein the tilt angle defined by the optical axis of the first compensation film and the plane parallel with the substrate of the liquid crystal cell is 1° to 20°.
<7> The liquid crystal display device according to any one of <1> to <6>, wherein the first compensation film has a retardation Re(550) of 20 to 300 nm and a value Nz (Nz=Rth(550)/Re(550)+0.5) of 0.9 to 1.1, where Re(550) is a retardation in plane (nm) at a wavelength of 550 nm, and Rth(550) is a retardation along the thickness direction (nm) at a wavelength of 550 nm.
<8> The liquid crystal display device according to any one of <1> to <7>, comprising a protective film satisfying the following conditions in the first polarizer adjacent to the liquid crystal cell;

$-50\ \text{nm} \leq Re(550) \leq 50\ \text{nm}$ $-50\ \text{nm} \leq Rth(550) \leq 50\ \text{nm}$ where Re(550) is a retardation in plane (nm) at a wavelength of 550 nm, and Rth(550) is a retardation along the thickness direction (nm) at a wavelength of 550 nm.
<9> The liquid crystal display device according to any one of <1> to <8>, comprising a second compensation film in the second polarizer adjacent to the liquid crystal cell.
<10> The liquid crystal display device according to <9>, wherein the second compensation film satisfies the following condition;

$0\ \text{nm} \leq |Re(550)| \leq 550\ \text{nm}$ where |Re(550)| is the absolute value of the retardation in plane (nm) at a wavelength of 550 nm.

<11> The liquid crystal display device according to <9>, wherein the second compensation film satisfies the following condition;

$150\ \text{nm} \leq Re(550) \leq 300\ \text{nm}$ $-100\ \text{nm} \leq Rth(550) \leq 100\ \text{nm}$ where Re(550) is a retardation in plane (nm) at a wavelength of 550 nm, and Rth(550) is a retardation along the thickness direction (nm) at a wavelength of 550 nm.
<12> The liquid crystal display device according to any one of <9> to <11>, wherein the second compensation film consists of two layers.
<13> The liquid crystal display device according to <12>, wherein one of the two layers of the second compensation film satisfies the following condition;

$-100\ \text{nm} \leq Re(550) \leq 100\ \text{nm}$ $-250\ \text{nm} \leq Rth(550) \leq 0\ \text{nm}$, and the other layer satisfies the following condition;

$0\ \text{nm} \leq Re(550) \leq 200\ \text{nm}$ $0\ \text{nm} \leq Rth(550) \leq 200\ \text{nm}$ where Re(550) is a retardation in plane (nm) at a wavelength of 550 nm, and Rth(550) is a retardation along the thickness direction (nm) at a wavelength of 550 nm.
<14> The liquid crystal display device according to <12>, wherein one of the two layers of the second compensation film satisfies the following condition;

$-50\ \text{nm} \leq Re(550) \leq 50\ \text{nm}$ $-200\ \text{nm} \leq Rth(550) \leq 100\ \text{nm}$, and the other layer satisfies the following condition;

$50\ \text{nm} \leq Re(550) \leq 150\ \text{nm}$ $50\ \text{nm} \leq Rth(550) \leq 150\ \text{nm}$ where Re(550) is a retardation in plane (nm) at a wavelength of 550 nm, and Rth(550) is a retardation along the thickness direction (nm) at a wavelength of 550 nm.
<15> The liquid crystal display device according to <12>, wherein one of the two layers of the second compensation film satisfies the following condition;

$-100\ \text{nm} \leq Re(550) \leq 100\ \text{nm}$ $0\ \text{nm} \leq Rth(550) \leq 250\ \text{nm}$, and the other layer satisfies the following condition;

$0\ \text{nm} \leq Re(550) \leq 200\ \text{nm}$ $-200\ \text{nm} \leq Rth(550) \leq 0\ \text{nm}$ where Re(550) is a retardation in plane (nm) at a wavelength of 550 nm, and Rth(550) is a retardation along the thickness direction (nm) at a wavelength of 550 nm.
<16> The liquid crystal display device according to <12>, wherein one of the two layers of the second compensation film satisfies the following condition;

$-50\ \text{nm} \leq Re(550) \leq 50\ \text{nm}$ $50\ \text{nm} \leq Rth(550) \leq 200\ \text{nm}$, and the other layer satisfies the following condition; following condition:

$-50\ \text{nm} \leq Re(550) \leq 150\ \text{nm}$ $-150\ \text{nm} \leq Rth(550) \leq 50\ \text{nm}$, where Re(550) is a retardation in plane (nm) at a wavelength of 550 nm, and Rth(550) is a retardation along the thickness direction (nm) at a wavelength of 550 nm.
<17> The liquid crystal display device according to any one of <1> to <16>, wherein the first compensation film satisfies the following condition;

$Re(450)/Re(550) \le 1.2$ $Rth(450)/Rth(550) \le 1.2$ where Re(450) and Re(550) are a retardation in plane (nm) at a wavelength of 450 nm and 550 nm, and Rth(450) and Rth(550) are a retardation along the thickness direction (nm) at a wavelength of 450 nm and 550 nm.
<18> The liquid crystal display device according to any one of <1> to <17>, wherein the first compensation film satisfies the following condition;

$Re(450)/Re(550) \le 0.9$ $Rth(450)/Rth(550) \le 0.9$ where Re(450) and Re(550) are a retardation in plane (nm) at a wavelength of 450 nm and 550 nm, and Rth(450) and Rth(550) are a retardation along the thickness direction (nm) at a wavelength of 450 nm and 550 nm.
<19> The liquid crystal display device according to any one of <1> to <18>, wherein at least one of the first compensation film and the second compensation film is a polymer film.
<20> The liquid crystal display device according to <19>, wherein the polymer film is selected from films of cellulose acylate film, cyclic olefin polymer film, and acrylic polymer film.
<21> The liquid crystal display device according to <19> or <20>, wherein the polymer film has a thickness of 1 to 90 μm.
<22> The liquid crystal display device according to <20> or <21>, wherein the acrylic polymer film contains an acrylic polymer having at least one unit selected from a lactone ring unit, a maleic anhydride unit, and a glutaric anhydride unit.
<23> The liquid crystal display device according to any one of <1> to <22>, wherein at least one of the first compensation film and the second compensation film is a polarizing plate sandwiched between a compensation film and a protective film in the polarizing plate.
<24> The liquid crystal display device according to <23>, wherein the protective film has a thickness of 10 to 80 μm.
<25> The liquid crystal display device according to any one of <1> to <24>, wherein the first and second polarizers each have a thickness of 50 μm or smaller.

Advantageous Effects of Invention

The invention can provide a liquid crystal display device that can suppress asymmetry of display of tint even when viewed from above, below, and the right and left sides, in a halftone display mode.

DESCRIPTION OF EMBODIMENTS

Figure 1:
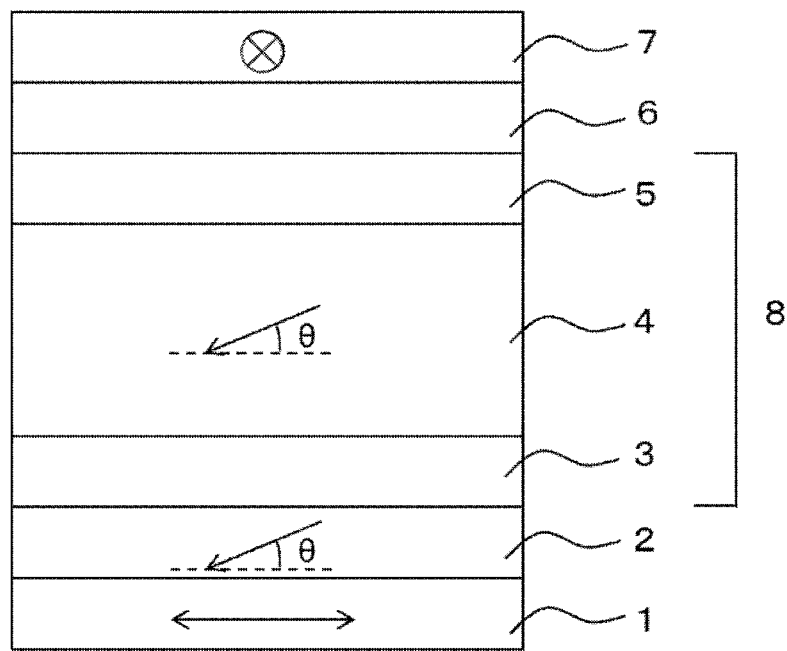
FIG. 1 is a conceptual diagram illustrating an example liquid crystal display device according to the invention.
Figure 3:
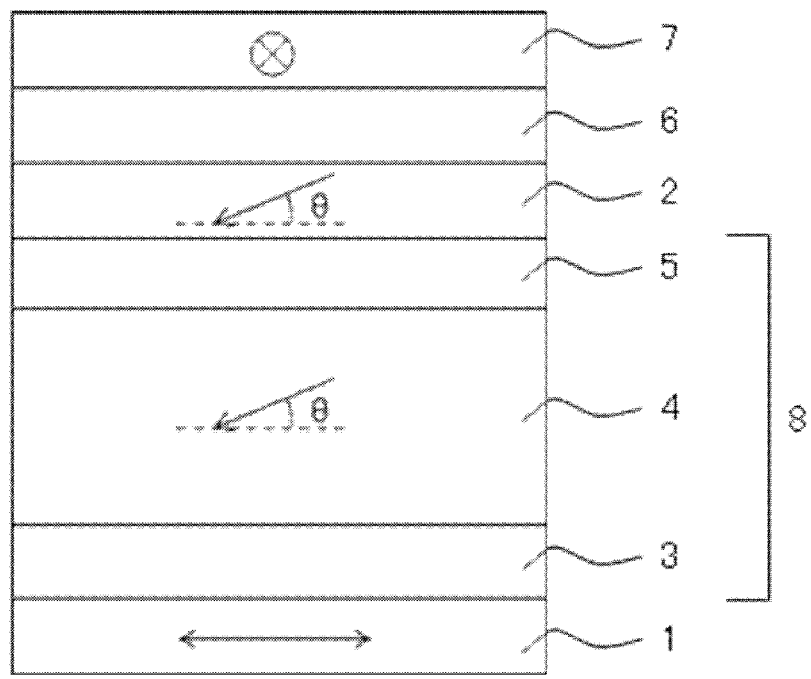
FIG. 3 is a conceptual diagram illustrating another example liquid crystal display device according to the invention.

The invention will now be described in detail. The sign "–" between a lower limit and an upper limit indicates a range including the limits throughout the specification.
Throughout the specification, the optical relationships among the axes include errors allowable in the art of the invention.
Throughout the specification, the direction parallel with the optical axis of a liquid crystal cell in a liquid crystal display device is referred to as "vertical direction," while the direction orthogonal to the optical axis of the liquid crystal cell is referred to as "horizontal direction," for descriptive purposes. These directions do not necessarily coincide with the actual vertical and lateral directions of the liquid crystal display device.
Embodiments of the invention will now be described in detail with reference to the drawings.
In specific, FIG. 1 illustrates a liquid crystal display device according to a first embodiment of the invention, and FIG. 3 illustrates a second embodiment. Each drawings uses reference signs common to FIG. 1. The embodiments will now be described in detail.

A liquid crystal display device according to the invention includes a first polarizer, a liquid crystal cell including a liquid crystal layer containing liquid crystal molecules aligned in parallel with the substrate of the liquid crystal cell, and a second polarizer, in sequence. The liquid crystal display device further includes a first compensation film between the first polarizer and the liquid crystal cell, or between the liquid crystal cell and the second polarizer. As viewed perpendicularly to the substrate of the liquid crystal cell, the absorption axis of the first polarizer is parallel with the optical axis of the first compensation film, and an angle ϕ between the absorption axis of the first polarizer and an optical axis of the liquid crystal layer in the liquid crystal cell satisfies 0°<ϕ. As viewed along the transmission axis of the first polarizer, the optical axis of the liquid crystal layer in the liquid crystal cell and the optical axis of the first compensation film have a tilt angle θ in the same direction to a face of the substrate of the liquid crystal cell. The first compensation film has a positive birefringence.

The angle ϕ between the absorption axis of the first polarizer and the optical axis of the liquid crystal layer in the liquid crystal cell should preferably be within the range of 0°<ϕ≤45°, more preferably within the range of 0°<ϕ≤15°, even more preferably within the range of 0°<ϕ≤7°, most preferably within the range of 0°<ϕ≤4°.

(First Embodiment)

A liquid crystal display device according to the first embodiment of the invention includes a first compensation film between a first polarizer and a liquid crystal cell. In specific, the liquid crystal display device according to the first embodiment includes the first polarizer, the first compensation film, the liquid crystal cell including a liquid crystal layer containing liquid crystal molecules aligned in parallel with the substrate of the liquid crystal cell, and a second polarizer, in sequence. As viewed perpendicularly to the substrate of the liquid crystal cell, the absorption axis of the first polarizer is parallel with the optical axis of the first compensation film, and an angle ϕ between the absorption axis of the first polarizer and an optical axis of the liquid crystal layer in the liquid crystal cell satisfies 0°<ϕ. In a cross section of the liquid crystal cell as viewed along the transmission axis of the first polarizer, the optical axis of the liquid crystal layer in the liquid crystal cell and the optical axis of the first compensation film have a tilt angle in the same direction to a face of the substrate of the liquid crystal cell. The first compensation film has a positive birefringence.

FIG. 1 is a conceptual diagram illustrating an example liquid crystal display device according to the invention. The top of FIG. 1 corresponds to the front of the device, while the bottom corresponds to the rear. FIG. 1 is a conceptual diagram and does not necessarily illustrate exact dimensions (the same can also be applied to the other drawings). FIG. 1 illustrates a first polarizer 1, a first compensation film 2, a LC-cell substrate at rear side 3, a liquid crystal layer 4, a LC-cell substrate at front side 5, a second compensation film 6, a second polarizer 7, and a liquid crystal cell 8 including the pair of LC-cell substrates 3 and 5 and the liquid crystal layer 4 between the LC-cell substrates.

The liquid crystal display device according to the invention essentially includes the first polarizer 1, the first compensation film 2, the IPS-mode liquid crystal cell 8, and the second polarizer 7, in sequence. The device may further include the second compensation film 6.

According to the invention, in a cross section of the liquid crystal cell as viewed along the transmission axis of the first polarizer (as illustrated in FIG. 1, for example), the optical axis of the liquid crystal layer in the liquid crystal cell 8 (the arrow in the liquid crystal layer 4 in FIG. 1) and the optical axis of the first compensation film (the arrow in the first compensation film 2 in FIG. 1) have a tilt angle (θ in FIG. 1) in the same direction to a face of the LC-cell substrate at rear side 3.

The tilt angle of a retardation layer is defined as an angle between the optical axis of the retardation layer and the interface of the retardation layer. The phrase "has a tilt angle in the same direction" not only indicates exactly the same direction but also allows errors allowable within the gist of the invention. In specific, an error from the exact direction should preferably be ±5°, and more preferably ±2°.

Although FIG. 1 illustrates an IPS-mode liquid crystal cell, the cell may be of an FFS mode. In this case, it is preferred that the top of FIG. 1 correspond to the rear of the liquid crystal display device, while the bottom correspond to the front.

Figure 2:
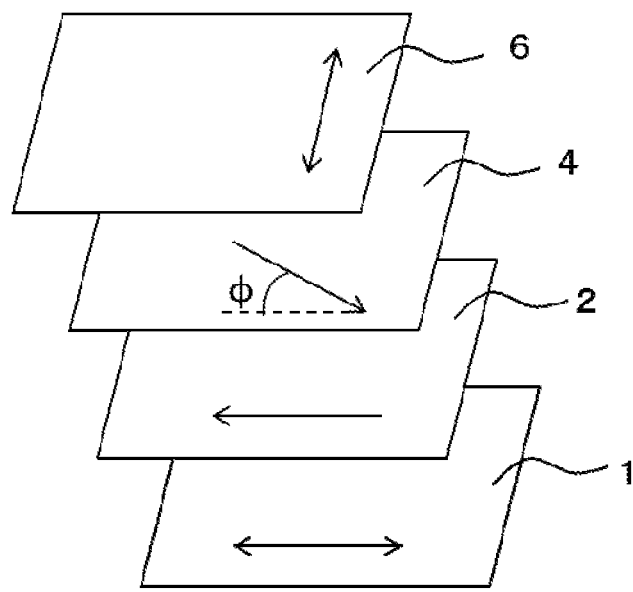
FIG. 2 is a conceptual diagram illustrating relationships among axes as viewed perpendicularly to a lower substrate of a liquid crystal cell in the liquid crystal display device in FIG. 1.

In the invention, as viewed perpendicularly to the lower substrate 3 of the IPS-mode liquid crystal cell 8, the absorption axis of the first polarizer 1 (the arrow in the first polarizer in FIG. 1) is parallel with the optical axis of the first compensation film 2 (the arrow in the first compensation film in FIG. 1). In more specific, although the absorption axis of the first polarizer 1 is not actually parallel with the optical axis of the first compensation film 2, they appear to be parallel with each other as viewed perpendicularly to the lower substrate 3 of the IPS-mode liquid crystal cell 8. FIG. 2 is a conceptual diagram illustrating relationships among the axes as viewed perpendicularly to the lower substrate 3 of the IPS-mode liquid crystal cell. FIG. 2 uses reference signs common to FIG. 1. As is apparent from FIG. 2, the absorption axis of the first polarizer 1 (the arrow in the first polarizer in FIG. 2) appears to be parallel with the optical axis of the first compensation film 2 (the arrow in the first compensation film 2 in FIG. 2) in a view perpendicular to the IC-cell substrate at lower side 3.

The term "parallel" allows errors within the gist of the invention. In specific, an error from the exact direction is smaller than ±10°, should preferably be smaller than ±5°, and more preferably smaller than ±3°.

The parallel alignment of the absorption axis of the first polarizer 1 with the optical axis of the first compensation film 2 in a view perpendicular to the LC-cell substrate at rear side 3 increases the productivity.

In a black display mode, the optical axis of the liquid crystal layer in the IPS-mode liquid crystal cell is parallel with the absorption axis of the first polarizer, as viewed perpendicularly to the LC-cell substrate. For a halftone or white display mode, a voltage applied to the cell switches the alignment direction of liquid crystal molecules. In the halftone display mode, as viewed perpendicularly to the LC-cell substrate, the absorption axis of the first polarizer defines an angle ϕ from the optical axis of the liquid crystal layer (the arrow in the liquid crystal layer 4 in FIG. 2). The angle ϕ indicates an acute or right angle between the absorption axis of the first polarizer and the optical axis of the liquid crystal layer in the liquid crystal cell.

(Second Embodiment)

A liquid crystal display device according to the second embodiment of the invention includes a first compensation film between a liquid crystal cell and a second polarizer. In specific, the liquid crystal display device according to the second embodiment includes a first polarizer, the liquid crystal cell including a liquid crystal layer containing liquid crystal molecules aligned in parallel with the substrate of the liquid crystal cell, the first compensation film, and the second polarizer, in sequence. As viewed perpendicularly to the substrate of the liquid crystal cell, the absorption axis of the first polarizer is parallel with the optical axis of the liquid crystal layer of the liquid crystal cell, and an angle ϕ between the absorption axis of the first polarizer and an optical axis of the liquid crystal layer in the liquid crystal cell satisfies 0°<ϕ. In a cross section of the liquid crystal cell as viewed along the transmission axis of the first polarizer, the optical axis of the liquid crystal layer in the liquid crystal cell and the optical axis of the first compensation film have a tilt angle in the same direction to a face of the substrate of the liquid crystal cell. The first compensation film has a positive birefringence.

Figure 4:
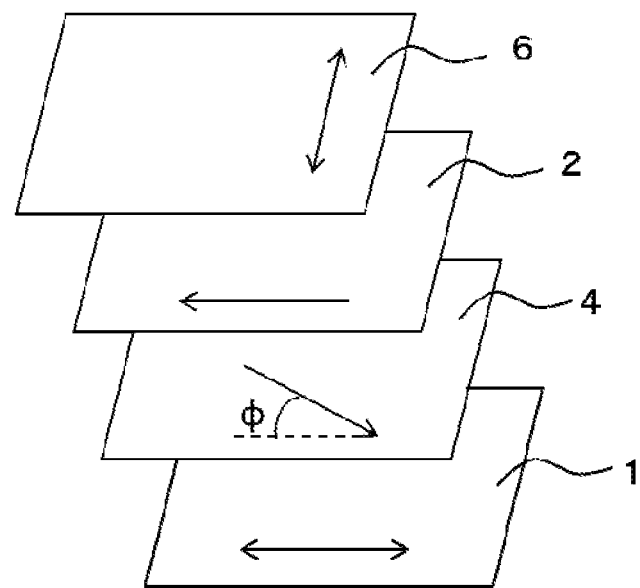
FIG. 4 is a conceptual diagram illustrating relationships among axes as viewed perpendicularly to a lower substrate of a liquid crystal cell in the liquid crystal display device in FIG. 3.

As illustrated in FIGS. 3 and 4, the first compensation film on the opposite side of the liquid crystal cell to that in the first embodiment can also improve tint in a halftone display mode. In specific, the liquid crystal display device includes a first polarizer 1, an IPS-mode liquid crystal cell 8, a first compensation film 2, and a second polarizer 7, in sequence. As viewed along the transmission axis of the first polarizer, the optical axis of the liquid crystal layer in the liquid crystal cell 8 (the arrow in the liquid crystal layer 4 in FIG. 3) and the optical axis of the first compensation film (the arrow in the first compensation film 2 in FIG. 3) are tilted at a tilt angle (θ in FIG. 3) in the same direction from a face of the LC-cell substrate at rear side 3. With reference to FIG. 4, as viewed perpendicularly to the LC-cell substrate at rear side, the absorption axis of the first polarizer (the arrow in the first polarizer 1 in FIG. 4) is parallel with the optical axis of the first compensation film (the arrow in the first compensation film 2 in FIG. 4).

A liquid crystal display device having such configurations can suppress asymmetry of display of tint even when viewed from above, below, and the right and left sides, in a halftone display mode. This result is contrary to the general expectation, as disclosed in Japanese Unexamined Patent Application Publication No. 2002-55341, that the optical axis of a liquid crystal layer in a liquid crystal cell should be tilted oppositely to the optical axis of a rear compensation film to reduce asymmetry of display of tint.

Figure 5:
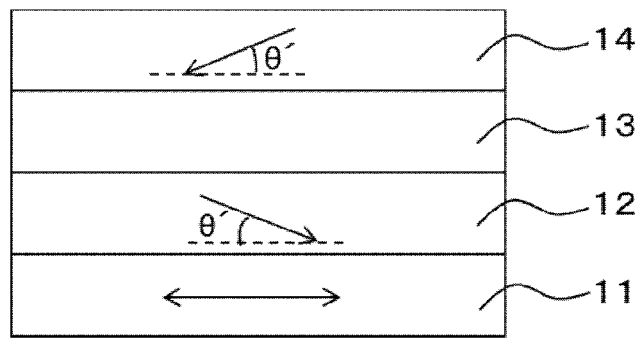
FIG. 5 is a conceptual diagram illustrating relationships among axes that were expected prior to the completion of the invention.

This point will now be described in further detail. FIG. 5 is a conceptual diagram illustrating relationships among axes that were expected prior to the completion of the invention.

FIG. 5 illustrates a rear polarizer 11, a rear compensation film 12, a rear LC-cell substrate 13, and a liquid crystal layer 14. The optical axis of the liquid crystal layer 14 (the arrow in the liquid crystal layer 14 in FIG. 5) and the optical axis of the compensation film 12 (the arrow in the compensation film 12 in FIG. 5) are tilted at a tilt angle (θ' in FIG. 5) in the opposite directions to a face of the LC-cell substrate 13. The compensation film 12 having such a configuration was expected to properly compensate for the adverse effects of the tilt angle of liquid crystal molecules. Studies by the inventors, contrary to the expectation, have revealed that a liquid crystal display device having the opposite configuration can suppress asymmetry of display of tint even when viewed from above, below, and the right and left sides. The principle will now be explained.

A typical liquid crystal cell of a horizontal electric field mode, such as an IPS mode, has an optical axis tilted from an LC-cell substrate by approximately 1° to 3°. The tilt angle leads to degradation of halftone colors in views from the right and left sides. In specific, the displayed colors become yellowish, which phenomenon makes an impression of light leakage. The yellowish colors should preferably be shifted closer to a blue or red color for appropriate color balance.

Figure 6:
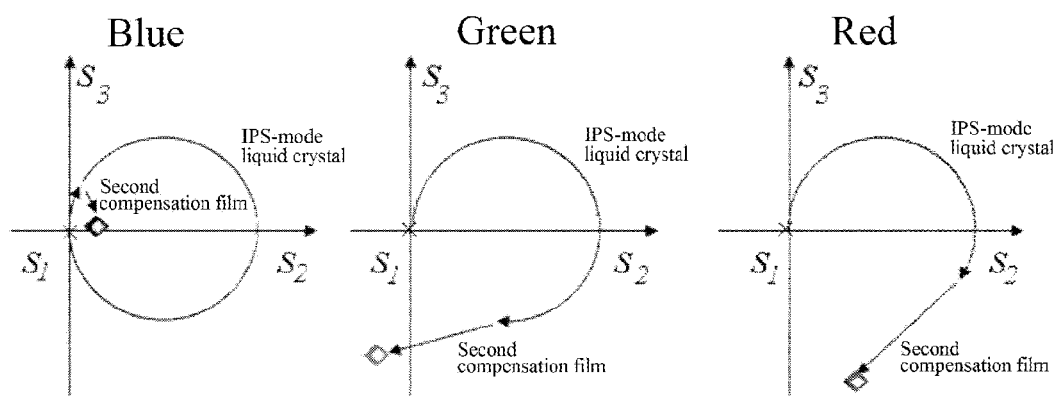
FIG. 6 is a conceptual diagram illustrating Poincare orbits in a liquid crystal display device free of a first compensation film in a lateral field of view.

In more specific, the phenomenon can be explained on the basis of Poincare orbits showing a polarization state. FIG. 6 illustrates Poincare orbits in a view from the right or left side in the liquid crystal display device in FIG. 1 free of the first compensation film 2, which displays a halftone color in 15 gray levels (256 steps). This embodiment corresponds to Comparative Example 1 (described below), for example. FIG. 6 illustrates Poincare orbits for blue, green, and red light components, in order from the left. In a Poincare orbit, the terminal point (indicated by a diamond mark in the drawing) closer to an extinction position (the origin indicated by a mark "x") represents less light leakage.

In the embodiment in FIG. 6, the IPS-mode liquid crystal generates a rotational orbit. The orbit of a blue light component goes in a circle and returns to the extinction position (origin); hence, the blue light component barely leaks. In contrast, the terminal points of the orbits of green and red light components significantly deviate from the extinction positions, due to insufficient rotational orbits generated by the IPS-mode liquid crystal; hence, green and red light components leak. The leakage of both green and red light components leads to the yellowish display when viewed from the right or left side.

Figure 7:
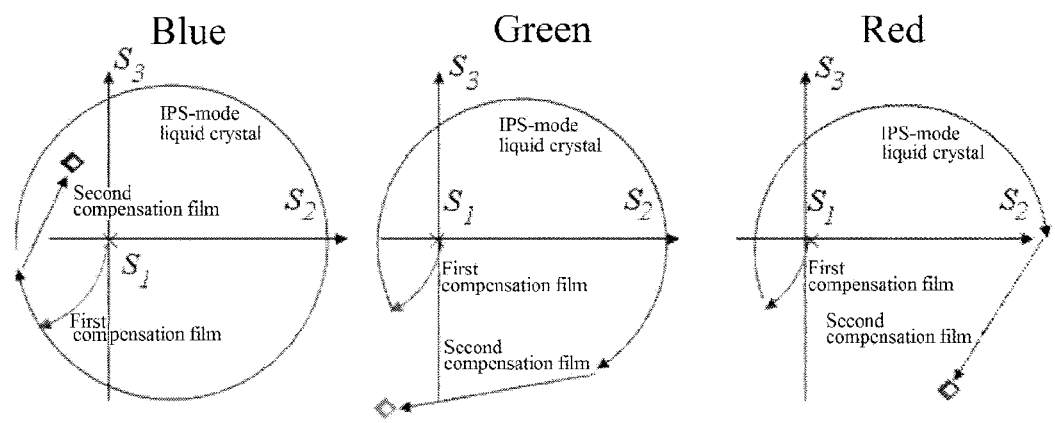
FIG. 7 is a conceptual diagram illustrating Poincare orbits in a liquid crystal display device including a first compensation film having an optical axis tilted oppositely to the optical axis of a liquid crystal cell, in a lateral field of view.

FIG. 7 illustrates Poincare orbits in a view from the right or left side in the liquid crystal display device, including a first compensation film having an optical axis tilted oppositely to the optical axis of a liquid crystal cell, which displays a halftone color in 15 gray levels (256 steps). This embodiment corresponds to the configuration in FIG. 5 and Comparative Example 3 (described below). FIG. 7 illustrates Poincare orbits for blue, green, and red light components, in order from the left. The first compensation film generates rotational orbits, which vary the entire Poincare orbits. The terminal point of the orbit of a blue light component does not significantly deviate from the extinction position, while those of green and red light components significantly deviate. This phenomenon leads to yellowish display when viewed from the right or left side.

Figure 8:
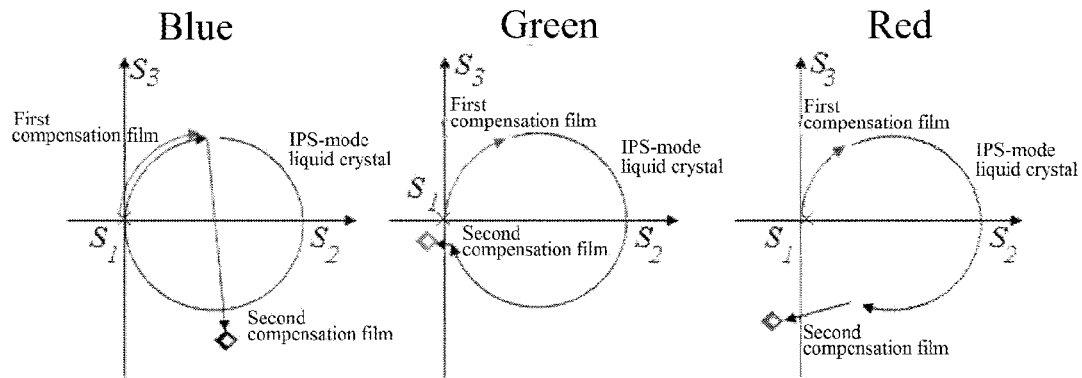
FIG. 8 is a conceptual diagram illustrating Poincare orbits in a liquid crystal display device according to the invention in a lateral field of view.

FIG. 8 illustrates Poincare orbits in a view from the right or left side in the liquid crystal display device according to the invention (FIG. 1), which displays a halftone color in 15 gray levels (256 steps). FIG. 8 illustrates Poincare orbits for blue, green, and red light components, in order from the left. According to the invention, the rotational orbit generated by the first compensation film is added to the rotational orbit generated by the IPS-mode liquid crystal, so that the terminal point of the orbit of a green light component approaches the extinction position. The first compensation film can prevent the leakage of a green light component, not a blue or red light component. The leakage of both blue and red light components can shift the yellowish display closer to a purple color.

Figure 9:
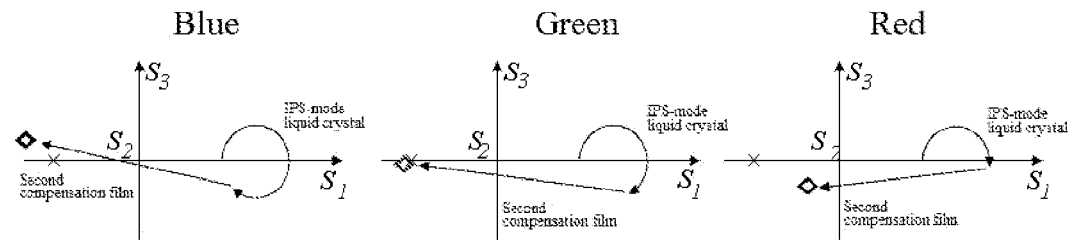
FIG. 9 is a conceptual diagram illustrating Poincare orbits in a liquid crystal display device free of a first compensation film in an upper field of view.
Figure 10:
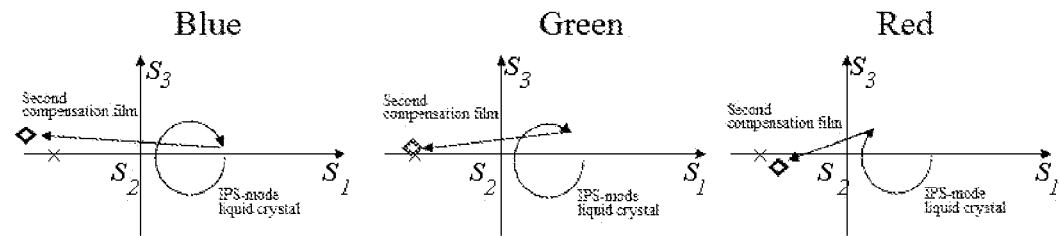
FIG. 10 is a conceptual diagram illustrating Poincare orbits in a liquid crystal display device free of a first compensation film in a lower field of view.

The imbalance of color in views from above and below is caused by both the tilt of IPS-mode liquid crystal molecules and the switching of the alignment direction of the liquid crystal molecules for a halftone display mode. These two factors cause a difference in the appearance of the IPS-mode liquid crystal between upper and lower fields of view. In specific, the liquid crystal in a halftone display mode appears reddish from above, and bluish from below. This phenomenon can be explained on the basis of the comparison of the Poincare orbits between views from above and below. FIGS. 9 and 10 illustrate Poincare orbits in the liquid crystal display device in FIG. 1 free of the first compensation film 2 in views from above and below, respectively. This embodiment corresponds to Comparative Example 1 (described below), for example. FIGS. 9 and 10 each illustrate Poincare orbits for blue, green, and red light components, in order from the left. In a Poincare orbit, the terminal point (indicated by a diamond mark in the drawing) closer to an extinction position (indicated by a mark "x") represents less light leakage.

The comparison between FIGS. 9 and 10 indicates a difference in the orbit in the IPS-mode liquid crystal between views from above and below. The difference in the orbit is caused by the different appearances of IPS-mode liquid crystal molecules between upper and lower fields of view, due to the tilt of the liquid crystal molecules and the switching of the alignment direction of the liquid crystal molecules. The apparent angle of the IPS-mode liquid crystal molecules determines the center of rotation in Poincare orbits, while the apparent shape of each liquid crystal molecule determines the angle of rotation in Poincare orbits. The centers and angles of rotational orbits generated by the IPS-mode liquid crystal are therefore different in Poincare orbits between upper and lower fields of view. The different orbits result in different eventual balance of blue, green, and red light components relative to the extinction position between upper and lower fields of view. In specific, the upper and lower fields of view have significantly different degrees of leakage of a red light component; hence, the halftone display appears reddish in the upper field of view, and bluish in the lower field of view.

Figure 11:
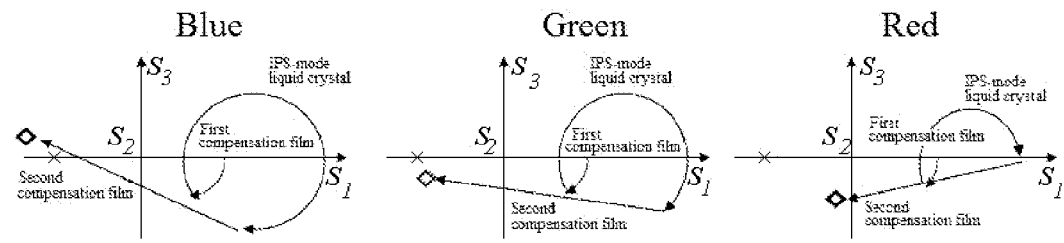
FIG. 11 is a conceptual diagram illustrating Poincare orbits in a liquid crystal display device including a first compensation film having an optical axis tilted oppositely to the optical axis of a liquid crystal cell, in an upper field of view.
Figure 12:
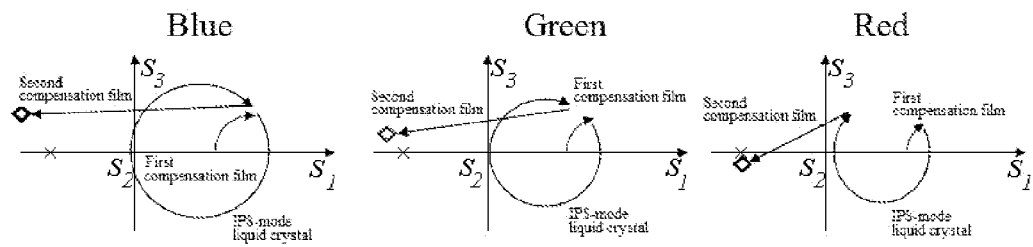
FIG. 12 is a conceptual diagram illustrating Poincare orbits in a liquid crystal display device including a first compensation film having an optical axis tilted oppositely to the optical axis of a liquid crystal cell, in a lower field of view.

FIGS. 11 and 12 illustrate Poincare orbits in the liquid crystal display device including the first compensation film having an optical axis tilted oppositely to the optical axis of the liquid crystal cell, in views from above and below, respectively. This embodiment corresponds to the configuration in FIG. 5 and Comparative Example 3 (described below). With reference to FIGS. 11 and 12, the balance relative to the extinction position is different between views from above and below. In specific, the halftone display appears reddish in the upper field of view, and bluish in the lower field of view.

Figure 13:
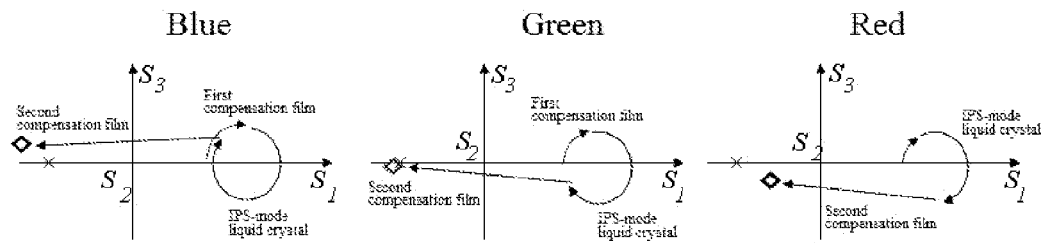
FIG. 13 is a conceptual diagram illustrating Poincare orbits in a liquid crystal display device according to the invention in an upper field of view.
Figure 14:
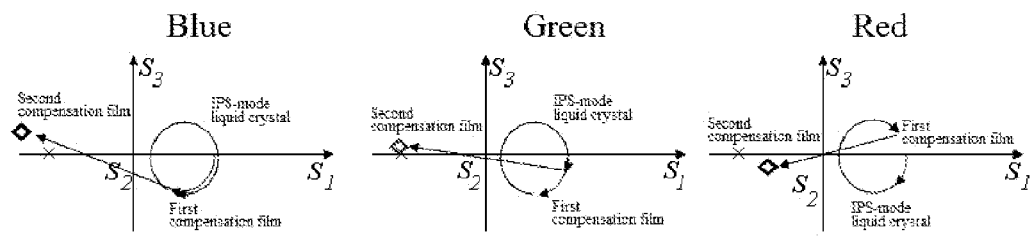
FIG. 14 is a conceptual diagram illustrating Poincare orbits in a liquid crystal display device according to the invention in a lower field of view.

FIGS. 13 and 14 illustrate Poincare orbits in the liquid crystal display device according to the first embodiment of the invention (FIG. 1), in views from above and below, respectively. FIGS. 13 and 14 each illustrate Poincare orbits for blue, green, and red light components, in order from the left. According to the embodiment, the first compensation film reduces the difference in the orbits caused by the tilt of IPS-mode liquid crystal molecules and the switching of the alignment direction of the liquid crystal molecules. This operation improves the balance relative to the extinction position between upper and lower fields of view. In specific, the combined rotational orbits generated by the first compensation film and the IPS-mode liquid crystal recover the original polarization state in the Poincare orbits, and reduces the difference in the orbits between the upper and lower fields of view. This operation reduces differences in colors between views from above and below, and entirely shifts the displayed colors in a halftone display mode closer to a purple color, so that the display device can suppress asymmetry of display of tint even when viewed from above or below.

This explanation can be applied only if the angle $\phi$ between the optical axis of the IPS-mode liquid crystal and the absorption axis of the first polarizer is small ($\phi \leq$ approximately 10°). If the angle $\phi$ is large relative to the tilt angle $\theta$ of the IPS-mode liquid crystal, the appearances of the IPS-mode liquid crystal are significantly different between upper and lower fields of view; hence, the above explanation for an improvement of asymmetry property of halftone tint cannot be applied. For this case, the principle should be explained separately for a dual-domain type and a single-domain type of IPS-mode liquid crystals.

An IPS-mode liquid crystal display device of a dual-domain type, which has two domains respectively having angles $\phi$ in the clockwise and counterclockwise directions, improves the asymmetry property of halftone colors as explained below. A dual-domain IPS-mode liquid crystal layer consists of equal micro regions in a plane. The driving direction in a half of the micro regions of the IPS-mode liquid crystal layer is clockwise, while that in the remaining half is counterclockwise. Views of each micro region from above and below have an increased difference in the combined angles $\theta$ and $\phi$, and are represented in Poincare orbits deviated from those in FIGS. 13 and 14. This phenomenon causes differences in halftone colors between upper and lower fields of view. The micro region, however, is sufficiently small, so that the actual halftone display appears to human eyes in a color caused by addition of the micro regions of the clockwise and counterclockwise orientations. The combined IPS-mode liquid crystals of the clockwise and counterclockwise orientations apparently offset the difference in the angles; hence, the Poincare orbits substantially coincide with those in FIGS. 13 and 14. This operation apparently reduces differences in colors between views from above and below, and entirely shifts the displayed halftone colors closer to a purple color. According to this principle, a dual-domain display device can cause difference in halftone tint when viewed from above or below even with a large angle $\phi$.

A single-domain display device, which has a single domain having an angle $\phi$ in the clockwise or counterclockwise direction, suppresses asymmetry of display of tint as explained below. The halftone display of an IPS-mode liquid crystal is achieved by the rotation of the average direction of the optical axes in the entire IPS-mode liquid crystal layer. In fact, due to a strong force of alignment by the alignment film for the liquid crystal layer, liquid crystal molecules distant from the alignment film are rotated, while molecules near the alignment film are barely rotated. The IPS-mode liquid crystal retains the original tilt angle $\theta$. The force of alignment near the alignment film enables improvement of the asymmetry property of tint in a single-domain display device even at a large angle $\phi$. The improvement in the single-domain display device, which is limited to the vicinity of the alignment film, is smaller than the improvement in the dual-domain display device over the entire regions.

The liquid crystal display device according to the invention provides advantageous effects described below.

If the viewing direction to a panel is defined using a polar angle, such that the axis perpendicular to the substrate of the liquid crystal cell is 0° and the axis in the plane of the substrate is 90°:

(1) at a polar angle of 60°, the standard deviation $\sigma$ of the hue angle (hab) of a variation in halftone colors (by an azimuth of 5° from 0° to 360°) in the a*b* plane (CIE L*a*b* color system (CIELAB)) is not larger than 70; and (2) at a polar angle of 60°, the maximum width $\Delta u'v'$ of a variation in halftone colors (by an azimuth of 5° from 0° to 360°) in the u'v' plane (CIE1976 UCS diagram) is not larger than 0.08.

The liquid crystal display device according to the invention can be variously sized, and is particularly suitable for a small or medium-sized display of 1-15 inches, for example. The reason is that the differences in colors in a halftone display mode in views from above and below, to be reduced by the invention, are particularly problematic in small and medium-sized displays. The invention can also provide the same advantageous effects in a large display, although the differences in colors are not often problematic in general large displays.

The configuration of the invention will now be described in detail.

<First Compensation Film>

Any first compensation film can be used in the invention, provided that the optical axis of the first compensation film is parallel with the absorption axis of the first polarizer as viewed perpendicularly to the substrate of the liquid crystal cell, the optical axis of the first compensation film and the optical axis of the liquid crystal layer are tilted at a tilt angle θ in the same direction to a face of the substrate of the liquid crystal cell, and the first compensation film has a positive birefringence. The first compensation film may have a single-layer or multi-layer configuration. A configuration including a support and a retardation layer is preferred in the invention. A multi-layer configuration is required to include a layer having a tilt angle in the same direction as the liquid crystal layer in the cell.

The term "optical axis" of the first compensation film indicates an axis providing the maximum refractive index if the first compensation film has a positive birefringence. The term indicates the axis of rotation of an index ellipsoid for a uniaxial first compensation film, or indicates a slow axis for a biaxial film.

The tilt angle of the optical axis should preferably be uniform in the compensation film. It is preferred in the invention that the first compensation film consist of an A-plate (O-plate) having a slight tilt angle. Although a typical A-plate has optical characteristics represented by nx>ny=nz, a plate having a retardation Re(550) of approximately 20-300 nm and a value Nz (Nz=Rth(550)/Re(550)+0.5) of approximately 0.9-1.1 is also called A-plate throughout the specification.

Specific examples of such an optically anisotropic film include a configuration including liquid crystal molecules in an alignment having a controlled tilt angle, a structural birefringent layer such as obliquely deposited inorganic film (Japanese Unexamined Patent Application Publication No. 2007-178536), and a polymer film conveyed through rollers operating at different rim speeds to have a slow axis tilted (at a tilt angle) from the thickness direction (Japanese Unexamined Patent Application Publication No. 2010-58495). These disclosures are incorporated herein by reference.

The first compensation film should preferably be fabricated by laminating liquid crystal molecules in a fixed alignment having a controlled tilt angle onto a support which is a polymer film, to be suitable for the fabrication.

The tilt angle of liquid crystal molecules may be controlled with a rubbed alignment film to provide a pretilt angle, and/or through addition of a tilt-angle controlling agent to the liquid crystal layer to vary a polar angle near the support or the air interface. These techniques should preferably be combined.

A typical example of the tilt-angle controlling agent is a copolymer of monomers containing fluoroaliphatic groups. Preferred is a copolymer with a monomer containing fused aromatic ring groups, or a copolymer with a monomer containing a carboxyl, sulfo, or phosphonooxy group, or a salt thereof. A combination of multiple tilt-angle controlling agents enables more accurate and stable control. Such tilt-angle controlling agents are disclosed in paragraphs 0022-0063 of Japanese Unexamined Patent Application Publication No. 2008-257205 and paragraphs 0017-0124 of Japanese Unexamined Patent Application Publication No. 2006-91732.

In general, liquid crystal compounds are classified into a rod-like type and a discotic type on the basis of the shape. Each type is further classified into a low-molecular subtype and a high-molecular subtype. The term "high-molecular compound" generally indicates a compound having a degree of polymerization of 100 or higher (Kobunshi Butsuri Souten-i Dainamikusu (Polymer Physics and Dynamics of Phase Transition); Masao Doi; p. 2; Iwanami Shoten, Publishers; 1992). The invention can use any liquid crystal compound, and preferably a rod-like or discotic liquid crystal compound. A rod-like or discotic liquid crystal compound having a reactive group is more preferred to prevent a variation due to temperature and humidity. It is even more preferred that at least one kind of liquid crystal compounds have two or more reactive groups in a single molecule. Two or more liquid crystal compounds may be combined. In this case, at least one liquid crystal compound should preferably have two or more reactive groups.

A mixture of two or more rod-like liquid crystal compounds, a mixture of two or more discotic liquid crystal compounds, or a mixture of rod-like and discotic liquid crystal compounds may be used.

The polymer film should preferably be selected from films of cellulose acylate, cyclic olefin polymers, and acrylic polymers. The acrylic polymer film should preferably contain an acrylic polymer having at least one unit selected from a lactone ring unit, a maleic anhydride unit, and a glutaric anhydride unit.

Any known discotic or rod-like liquid crystal compound can be used. Preferred is a liquid crystal compound having polymerizable groups to fix the alignment state. The liquid crystal compound may be laminated on the support which is the polymer film.

The first compensation film may consist of a single layer of a liquid crystal compound having polymerizable groups, which is fabricated by peeling a layer formed of a composition containing the liquid crystal compounds or coating the liquid crystal compound directly on the polarizer.

The thickness of the polymer film should preferably be 1-90 μm, more preferably 1-70 μm, most preferably 1-50 μm.

The tilt angle θ of the optical axis of the first compensation film from the substrate of the liquid crystal cell should preferably be 1°-20°, more preferably 1°-10°, even more preferably 1°-3°.

The first compensation film should preferably satisfy the following conditions:

$$20 \text{ nm} \leq Re(550) \leq 300 \text{ nm}$$

$$10 \text{ nm} \leq Rth(550) \leq 150 \text{ nm}$$

where Re(550) is a retardation in plane (nm) at a wavelength of 550 nm, and Rth(550) is a retardation along the thickness direction (nm) at a wavelength of 550 nm.

The first compensation film should more preferably satisfy the following conditions:

$$20 \text{ nm} \leq Re(550) \leq 100 \text{ nm}$$

$$10 \text{ nm} \leq Rth(550) \leq 50 \text{ nm}$$

A smaller wavelength dispersion defined by Re(450)/Re(550) of the in-plane retardation of the first compensation film and a smaller wavelength dispersion defined by Rth(450)/Rth(550) of the thickness retardation contribute to effective compensation. In specific, the first compensation film should preferably satisfy the following conditions:

$$Re(450)/Re(550) \leq 1.2$$

$$Rth(450)/Rth(550) \leq 1.2$$

where Re(450) is a retardation in plane (nm) at a wavelength of 450 nm and Rth(450) is a retardation along the thickness direction (nm) at a wavelength of 450 nm.

The first compensation film should more preferably satisfy the following conditions:

$$Re(450)/Re(550) \leq 1.0$$

$$Rth(450)/Rth(550) \leq 1.0$$

The first compensation film should even more preferably satisfy the following conditions:

$$Re(450)/Re(550) \leq 0.9$$

$$Rth(450)/Rth(550) \leq 0.9$$

The polymer film and the composition containing the liquid crystal compound, constituting the first compensation film, each may further contain any known additive such as plasticizer as appropriate. Such additives are disclosed in, for example, paragraphs 0138-0188 of Japanese Unexamined Patent Application Publication No. 2013-047794.

Techniques to reduce the values Re(450)/Re(550) and Rth(450)/Rth(550) are disclosed in, for example, Japanese Unexamined Patent Application Publication Nos. 2010-84032 and 2010-031223, Published Japanese Translation of PCT International Patent Publication No. 2012-500234, and International Publication No. WO 2013-018526.

To prevent a reduction in the front contrast due to the first compensation film, the contrast value of the film represented by Expression (1) below should preferably be not lower than 3000, and more preferably not lower than 7000.

Contrast value of compensation film=(maximum luminance of compensation film disposed between two polarizing plates in parallel nicols)/(minimum luminance of compensation film disposed between two polarizing plates in cross nicols)     Expression (1)

For the first compensation film containing liquid crystal molecules in a fixed alignment state, the half width of the distribution of alignment axes in a microscopic region should preferably be not larger than 1°, and more preferably not larger than 0.3°, to achieve a desirable contrast value.

Such a highly ordered alignment is achieved by the selection of an alignment film, the selection of an auxiliary agent for alignment, and/or the selection of a liquid crystal compound (e.g., a compound having molecules in a smectic phase). In specific, such compounds are disclosed in paragraphs 0040-0100 of Japanese Unexamined Patent Application Publication No. 2008-50553. Liquid crystal compounds disclosed in paragraphs 0020-0039 of Japanese Unexamined Patent Application Publication No. 2008-50553 are also preferable to achieve a highly ordered alignment. These disclosures are incorporated herein by reference.

<Second Compensation Film>

It is preferred in the invention that the second compensation film be disposed between the liquid crystal cell of a horizontal electric field mode, such as an IPS mode, and the second polarizer. The second compensation film can further improve the diagonal contrast. The second compensation film may be any known film capable of compensation in a liquid crystal display device of the horizontal electric field mode. A preferred film has a retardation comparable to a λ/2 plate where λ is a wavelength (550 nm in the invention). The film having a retardation comparable to the λ/2 plate should preferably have a retardation of λ/2±30%, and more preferably a retardation of λ/2±15%. The second compensation film may have a single-layer or multi-layer configuration, provided that the film has performance comparable to the λ/2 plate. The retardation in plane of the entire second compensation film should preferably satisfy the following condition:

$$0 \text{ nm} < |Re(550)| \leq 1550 \text{ nm}$$

where |Re(550)| is the absolute value of the retardation in plane (nm) at a wavelength of 550 nm.

The second compensation film should more preferably satisfy the following condition:

$$50 \text{ nm} \leq |Re(550)| \leq 300 \text{ nm}$$

The second compensation film may contain any material provided that the film has the desired retardation. The film should preferably contain a polymer film and formed of a liquid crystal composition in view of easiness manufacturing. The polymer film should preferably be selected from films of cellulose acylate, cyclic olefin polymers, and acrylic polymers. The acrylic polymer film should preferably contain an acrylic polymer having at least one unit selected from a lactone ring unit, a maleic anhydride unit, and a glutaric anhydride unit. The liquid crystal compound may be any known discotic or rod-like liquid crystal compound. A preferred liquid crystal compound has polymerizable groups to fix the alignment state. The liquid crystal compound may be laminated on the support consisting of the polymer film.

The second compensation film may consist of a single layer of a liquid crystal compound having polymerizable groups, which is fabricated by peeling a layer formed of a composition containing the liquid crystal compounds.

To reduce the thickness of the device, the polymer film should preferably have a smaller thickness while maintaining the optical characteristics, physical properties, and suitability for the fabrication. The thickness should preferably be 1-90 μm, more preferably 1-70 μm, most preferably 1-50 μm.

Examples of the second compensation film having a single-layer configuration and a double-layer configuration will now be described.

(1) The second compensation film according to a first embodiment has a single-layer configuration. The single-layer second compensation film should preferably satisfy the following conditions:

$$150 \text{ nm} \leq Re(550) \leq 300 \text{ nm}$$

$$-100 \text{ nm} \leq Rth(550) \leq 100 \text{ nm}$$

The second compensation film should more preferably satisfy the following conditions:

$$200 \text{ nm} \leq Re(550) \leq 250 \text{ nm}$$

$$\leq 50 \text{ nm} \leq Rth(550) \leq 50 \text{ nm}$$

The single-layer second compensation film according to the first embodiment is advantageous in reduction of the thickness of the panel and reduction of the number of components.

The second compensation film can be fabricated by highly stretching a polymer film having characteristics represented by nz>nx.

For example, the fabrication of a film containing cellulose acetate benzoate, being cellulose acylate substituted by aromatic acyl groups, involves casting dope that contains a solvent dissolving cellulose acetate benzoate onto a metal support for film formation, evaporating the solvent to form a film, and stretching the solution-cast film at a large draw ratio of 1.3-1.9 to align the molecular chains of cellulose.

The thickness of the single-layer second compensation film should preferably be 1-90 μm, more preferably 1-70 μm, most preferably 1-50 μm.

(2) The second compensation film according to a second embodiment has a double-layer configuration including a biaxial film (B-plate) having characteristics represented by nx>ny>nz, and a [quasi-]uniaxial film having characteristics represented by nx≈ny<nz (positive [quasi-]C-plate).

In this embodiment, the two layers of the second compensation film may be laminated in any order. In a configuration including the uniaxial film adjacent to the LC-cell substrate and the biaxial film adjacent to the second polarizer, the slow axis of the biaxial film should be orthogonal to the absorption axis of the second polarizer. In a configuration including the biaxial film adjacent to the LC-cell substrate and the uniaxial film adjacent to the second polarizer, the slow axis of the biaxial film should be parallel with the absorption axis of the second polarizer.

(Biaxial Film)

The biaxial film in the second compensation film should preferably satisfy the following conditions:

$$0 \text{ nm} \leq Re(550) \leq 200 \text{ nm}$$

$$0 \text{ nm} \leq Rth(550) \leq 200 \text{ nm}$$

The biaxial film in the second compensation film should more preferably satisfy the following conditions:

$$50 \text{ nm} \leq Re(550) \leq 150 \text{ nm}$$

$$50 \text{ nm} \leq Rth(550) \leq 150 \text{ nm}$$

The biaxial film can be fabricated by stretching a cellulose acylate film or a polymer film of cyclic polyolefin or polycarbonate produced through any appropriate process such as melt casting or solution casting. The film is stretched with, for example, rollers operating at controlled rim speeds for longitudinal stretching, a tenter for cross-direction stretching, or biaxial stretching. In specific, such techniques are disclosed in Japanese Unexamined Patent Application Publication No. 2005-338767. Alternatively, a polymer formed of a composition containing a liquid crystal compound having polymerizable groups showing biaxial characteristics after alignment may be used.

([Quasi-] Uniaxial Film)

The [quasi-]uniaxial film in the second compensation film should preferably satisfy the following conditions:

$$-100 \text{ nm} \leq Re(550) \leq 100 \text{ nm}$$

$$-250 \text{ nm} \leq Rth(550) \leq 0 \text{ nm}$$

The [quasi-]uniaxial film in the second compensation film should more preferably satisfy the following conditions:

$$-50 \text{ nm} \leq Re(550) \leq 50 \text{ nm}$$

$$-200 \text{ nm} \leq Rth(550) \leq 100 \text{ nm}$$

The [quasi-]uniaxial film can be fabricated by forming a cellulose acylate film or a film of cyclic polyolefin or polycarbonate such that the film has no retardation in plane, and stretching the film in the thickness direction (nz) with a heat-shrinkable film. The [quasi-]uniaxial film may be provided with a layer containing liquid crystal molecules in a fixed alignment state (e.g., rod-like liquid crystal molecules in a vertically aligned state) to achieve a desired retardation.

The thickness of the second compensation film according to the second embodiment should preferably be 1-180 μm, more preferably 1-140 μm, most preferably 1-100 μm.

(3) The second compensation film according to a third embodiment includes a biaxial film (B-plate) having characteristics represented by nx>nz>ny, and a [quasi-]uniaxial film having characteristics represented by nx≈ny>nz (negative [quasi-]C-plate).

In this embodiment, the two layers of the second compensation film may be laminated in any order. In a configuration including the uniaxial film adjacent to the LC-cell substrate and the biaxial film adjacent to the second polarizer, the slow axis of the biaxial film should be parallel with the absorption axis of the second polarizer. In a configuration including the biaxial film adjacent to the LC-cell substrate and the uniaxial film adjacent to the second polarizer, the slow axis of the biaxial film should be orthogonal to the absorption axis of the second polarizer.

(Biaxial Film)

The biaxial film in the second compensation film should preferably satisfy the following conditions:

$$0 \text{ nm} \leq Re(550) \leq 200 \text{ nm}$$

$$-200 \text{ nm} \leq Rth(550) \leq 0 \text{ nm}$$

The biaxial film in the second compensation film should more preferably satisfy the following conditions:

$$50 \text{ nm} \leq Re(550) \leq 150 \text{ nm}$$

$$-150 \text{ nm} \leq Rth(550) \leq -50 \text{ nm}$$

The biaxial film can be fabricated by forming a cellulose acylate film having a high degree of substitution, or a film having a negative intrinsic birefringence, such as a film of styrene, a derivative thereof, polycarbonate, acrylic resin, or polyester (e.g., fumaric acid diester), such that the film has a retardation in plane.

For example, the fabrication of a film containing cellulose acetate involves casting dope that contains a solvent dissolving cellulose acetate onto a metal support for film formation, evaporating the solvent to form a film, and stretching the solution-cast film at a large draw ratio of 1.3-1.9 to align the molecular chains of cellulose.

(Uniaxial Film)

The uniaxial film in the second compensation film should preferably satisfy the following conditions:

$$-100 \text{ nm} \leq Re(550) \leq 100 \text{ nm}$$

$$0 \text{ nm} \leq Rth(550) \leq 250 \text{ nm}$$

The uniaxial film in the second compensation film should more preferably satisfy the following conditions:

$$-50 \text{ nm} \leq Re(550) \leq 50 \text{ nm}$$

$$50 \text{ nm} \leq Rth(550) \leq 200 \text{ nm}$$

The uniaxial film may be provided with a layer having a retardation of nz>nx through fixation of the alignment state of liquid crystal molecules; or the uniaxial film may be a cellulose acylate film or a film of cyclic polyolefin or polycarbonate prepared to have no retardation in plane. Alternatively, the retardation in plane emerging in the film may be offset, so that the uniaxial film has characteristics represented by nx≈ny. Alternatively, a polymer formed of a composition containing a liquid crystal compound having polymerizable groups, such that discotic liquid crystal molecules are horizontally aligned, may be used.

The thickness of the second compensation film according to the third embodiment should preferably be 1-180 μm, more preferably 1-140 μm, most preferably 1-100 μm.

The second compensation film may further contain any known additive such as plasticizer as appropriate. Such additives are disclosed in, for example, paragraphs 0138-0188 of Japanese Unexamined Patent Application Publication No. 2013-047794.

<Liquid Crystal Cell of Horizontal Electric Field Mode, Such as IPS Mode>

The invention may adopt any known liquid crystal cell of a horizontal electric field mode, such as an IPS mode. Such a liquid crystal cell is disclosed in, for example, Japanese Unexamined Patent Application Publication No. 2013-019943.

The term "optical axis" of the liquid crystal layer in the liquid crystal cell indicates an axis providing the maximum refractive index if the liquid crystal in the cell has a positive birefringence. The term indicates the axis of rotation of an index ellipsoid for a uniaxial liquid crystal, or indicates a slow axis for a biaxial liquid crystal.

The optical axis should preferably be tilted at a uniform tilt angle θ in the liquid crystal cell. If the optical axis of the liquid crystal cell is not uniformly tilted, the tilt direction of the liquid crystal in the cell is defined as an average tilt direction of liquid crystal molecules near the upper and lower interfaces.

It is preferred in the invention that the liquid crystal layer in the liquid crystal cell has regions having an optical axis deviating rightward and regions having an optical axis deviating leftward from the absorption axis of the first polarizer, as viewed perpendicularly to the substrate of the liquid crystal cell. In the invention, the angle φ defined by the optical axis of the liquid crystal layer in the liquid crystal cell is larger than 0°. Such a liquid crystal cell can be extracted from various liquid crystal display devices of a horizontal electric field mode, such as an IPS mode, which display a halftone or white color.

<First Polarizer and Second Polarizer>

The first and second polarizers in the invention each may be any known polarizer.

The invention may adopt any common linear polarizer. The linear polarizer should preferably be a coated polarizer represented by a product of Optiva Inc., or a polarizer containing a binder and iodine or dichroic pigment. Molecules of the iodine or dichroic pigment in the linear polarizer are aligned in the binder to achieve the polarizing ability. The iodine or dichroic pigment molecules should preferably be aligned along molecules of the binder; alternatively, the dichroic pigment molecules should preferably be aligned in one direction through self-organization like liquid crystal molecules. A typical current process of fabricating commercially available polarizers involves immersing a stretched polymer into an iodine bath or a dichroic pigment solution to allow the iodine or dichroic pigment to penetrate into the binder.

The first and second polarizers each have any thickness, and should preferably have a thickness of 50 μm or smaller.

<Protective Films for Polarizer>

A typical polarizing plate includes a polarizer and protective films thereon to protect the polarizer.

The protective film in the polarizing plate adjacent to the liquid crystal cell may also function as the first or second compensation film, provided that the film can protect the polarizer.

The protective film not functioning as a compensation film should preferably have the following optical characteristics:

−50 nm≤$Re(550)$≤50 nm

−50 nm≤$Rth(550)$≤50 nm where Re(550) is a retardation in plane (nm) at a wavelength of 550 nm, and Rth(550) is a retardation along the thickness direction (nm) at a wavelength of 550 nm.

The protective film not functioning as a compensation film should preferably have optical isotropy, unless another film having a retardation is further provided to achieve designed optical compensation.

The protective film in the polarizing plate distant from the liquid crystal cell has functions of physically protecting the polarizer and providing light resistance and weather resistance to the polarizer. To achieve these functions, the protective film may further contain a functional compound, such as uv absorbent, or may be provided with a functional layer thereon.

The protective film for the polarizer may be composed of cellulose acylate, polycarbonate, polysulfone, polyethersulfone, poly acrylate, polymethacrylate, cyclic polyolefin, polyolefin, polyamides, polystyrene, or polyesters. A preferred film is composed of cellulose acylate, cyclic polyolefin, polyacrylate, or polymethacrylate. A cellulose acetate film is most preferred. A commercially available cellulose acetate film (e.g., "TD80U" or "Z-TAC" manufactured by FUJIFILM Corporation) may also be used.

The protective film in the polarizing plate distant from the liquid crystal cell should preferably have a low permeability to water vapor to prevent irregularity in a display and improve the durability of the polarizing plate. The protective film may consist of a single layer of a polymer film having a reduced permeability to water vapor, or may be provided with a functional layer thereon to reduce the permeability to water vapor.

As used herein, symbol $Re(\lambda)$ refers to the retardation in a plane at a wavelength λ (nm), and symbol $Rth(\lambda)$ refers to the retardation across the thickness at a wavelength λ (nm). $Re(\lambda)$ is measured by irradiating a film with light having a wavelength λ (nm) in the normal direction with a KOBRA 21ADH or KOBRA WR birefringence analyzer (from Oji Scientific Instruments). The measurement wavelength λ (nm) may be selected by manually replacing a wavelength selective filter or converting the measurements, for example, with software. If the film for measurement has a uniaxial or biaxial optical indicatrix, $Rth(\lambda)$ is calculated through the following procedure.

When a film to be analyzed is expressed by a uniaxial or biaxial index ellipsoid, $Rth(\lambda)$ of the film is calculated as follows. $Rth(\lambda)$ is calculated by KOBRA 21ADH or WR on the basis of the six $Re(\lambda)$ values which are measured for incoming light of a wavelength λ nm in six directions which are decided by a 10° step rotation from 0° to 50° with respect to the normal direction of a sample film using an in-plane slow axis, which is decided by KOBRA 21ADH, as an inclination axis (a rotation axis; defined in an arbitrary in-plane direction if the film has no slow axis in plane), a value of hypothetical mean refractive index, and a value entered as a thickness value of the film.

In the above, when the film to be analyzed has a direction in which the retardation value is zero at a certain inclination angle, around the in-plane slow axis from the normal direction as the rotation axis, then the retardation value at the inclination angle larger than the inclination angle to give a zero retardation is changed to negative data, and then the $Rth(\lambda)$ of the film is calculated by KOBRA 21ADH or WR.

Around the slow axis as the inclination angle (rotation angle) of the film (when the film does not have a slow axis, then its rotation axis may be in any in-plane direction of the film), the retardation values are measured in any desired inclined two directions, and based on the data, and the estimated value of the mean refractive index and the inputted film thickness value, Rth may be calculated according to formulae (A) and (III):

$$Re(\theta) = \left[ nx - \frac{ny \times nz}{\sqrt{\left(ny\sin\left(\sin^{-1}\left(\frac{\sin(-\theta)}{nx}\right)\right)\right)^2 + \left(nz\cos\left(\sin^{-1}\left(\frac{\sin(-\theta)}{nx}\right)\right)\right)^2}} \right] \times \frac{d}{\cos\left(\sin^{-1}\left(\frac{\sin^{-1}(-\theta)}{nx}\right)\right)}$$

formula (A)

Re(θ) represents a retardation value in the direction inclined by an angle θ from the normal direction; nx represents a refractive index in the in-plane slow axis direction; ny represents a refractive index in the in-plane direction perpendicular to nx; and nz represents a refractive index in the direction perpendicular to nx and ny. And "d" is a thickness of the film.

$$Rth = \{(nx+ny)/2 - nz\} \times d \quad (III)$$

In the formula, nx represents a refractive index in the in-plane slow axis direction; ny represents a refractive index in the in-plane direction perpendicular to nx; and nz represents a refractive index in the direction perpendicular to nx and ny. And "d" is a thickness of the film.

When the film to be analyzed is not expressed by a monoaxial or biaxial index ellipsoid, or that is, when the film does not have an optical axis, then Rth(λ) of the film may be calculated as follows:

Re(λ) of the film is measured around the slow axis (judged by KOBRA 21ADH or WR) as the in-plane inclination axis (rotation axis), relative to the normal direction of the film from −50 degrees up to +50 degrees at intervals of 10 degrees, in 11 points in all with a light having a wavelength of λ nm applied in the inclined direction; and based on the thus-measured retardation values, the estimated value of the mean refractive index and the inputted film thickness value, Rth (λ) of the film may be calculated by KOBRA 21ADH or WR.

In the above-described measurement, the hypothetical value of mean refractive index is available from values listed in catalogues of various optical films in Polymer Handbook (John Wiley & Sons, Inc.). Those having the mean refractive indices unknown can be measured using an Abbe refract meter. Mean refractive indices of some main retardation films are listed below:

cellulose acylate (1.48), cycloolefin polymer (1.52), polycarbonate (1.59), polymethylmethacrylate (1.49) and polystyrene (1.59).

The instrument KOBRA-21ADH or KOBRA-WR calculates nx, ny, and nz, through input of the assumed average refractive index and the film thickness, and then calculates Nz=(nx−nz)/(nx−ny) on the basis of the calculated nx, ny, and nz.

The retardations Re and Rth are measured at a wavelength λ of 550 nm in the visual light range unless otherwise indicated.

(Measurement of Tilt Angles of Retardation Layer and Liquid Crystal Cell)

It is difficult to directly and accurately measure a tilt angle θ1 in one interface and a tilt angle θ2 in the other interface of a retardation layer (the term "tilt angle" indicates an angle defined by the optical axis of the retardation layer and an interface of the retardation layer). Throughout the specification, the tilt angles θ1 and θ2 are calculated through the process explained below. The calculated results do not accurately represent the actual state of the invention, but can effectively represent relative relationships of some of the optical characteristics of an optical film.

To simplify the calculation, the tilt angles in the two interfaces of the retardation layer (also referred to as "optically anisotropic layer") are defined on the basis of the following two assumptions:

1. The retardation layer is assumed to have a multi-layer configuration.
2. The tilt angle of each layer of the retardation layer linearly and monotonically varies along the thickness direction of the retardation layer.

The calculation process will now be explained in specific.

(1) In a plane in which the tilt angle of each layer linearly and monotonically varies along the thickness direction of the retardation layer, the incident angle of a measuring beam to the retardation layer is varied to obtain retardation values at three or more incident angles. To simplify the measurement and calculation, the retardation values should preferably be measured at three angles of −40°, 0°, and +40° (the normal direction relative to the retardation layer is defined as 0°). Such measurement can be performed with an analyzer "KOBRA-21ADH" or "KOBRA-WR" (manufactured by Oji Scientific Instruments), a transmission ellipsometer "AEP-100" (manufactured by Shimadzu Corporation), an analyzer "M150" or "M520" (manufactured by JASCO Corporation), or "ABR10A" (manufactured by Uniopt Corporation, Ltd.).

(2) In this model, "no" indicates the refractive index of ordinary light and "ne" indicates the refractive index of extraordinary light in each layer (the refractive indexes ne and no are each identical in all the layers), and "d" indicates the thickness of the entire multi-layer configuration. On the basis of the assumption that the tilt direction in each layer coincides with the uniaxial optical axis of the layer, the tilt angle θ1 in one interface and the tilt angle θ2 in the other interface of the retardation layer are determined through a fitting operation such that the dependence of the retardation value on the angle in the retardation layer coincides with the measured value.

The refractive indexes no and ne each may be any known value from references and catalogues. If the values are unknown, the refractive indexes can be measured with an Abbe refractometer. The thickness of the retardation layer can be determined with an interference thickness meter or measured in a cross-sectional image captured by a scanning electron microscope.

EXAMPLES

The invention will now be described in further detail with reference to examples. The materials, amounts and proportion thereof, and the details and order of the processes in the examples may be modified as required, within the gist of the invention. The scope of the invention should not be limited to the examples.

<Preparation of First Compensation Film>
<<Fabrication of First Compensation Film (Examples 1-7 and Comparative Example 3)>>

The support was a commercially available cellulose triacetate film "Z-TAC" (manufactured by FUJIFILM Corporation). The film Z-TAC was conveyed through dielectric heating rollers kept at 60° C., to raise the surface temperature of the film to 40° C. An alkaline solution having a composition shown below was applied onto one surface of the film into a density of 14 ml/m² with a bar coater. The film was heated to 110° C. and was conveyed through a steamed far-infrared heater (manufactured by NORITAKE CO., LIMITED) for ten seconds. The film was then coated with pure water into a density of 3 ml/m² with the bar coater. After three cycles of washing using a fountain coater and drainage using an air knife, the film was conveyed for drying through a drying zone kept at 70° C. for ten seconds. This process yielded an alkali-saponified cellulose-acetate transparent support.

Composition of Alkaline Solution (Parts by Mass)

| | |
|---|---|
| Potassium hydroxide | 4.7 parts by mass |
| Water | 15.8 parts by mass |
| Isopropyl alcohol | 63.7 parts by mass |
| Surfactant SF-1: $C_{14}H_{29}O(CH_2CH_2O)_{20}H$ | 1.0 part by mass |
| Propylene glycol | 14.8 parts by mass |

The resulting cellulose-acetate transparent support was continuously coated with a coating solution for an alignment film A (having a composition shown below) with a wire bar #8. After the coated layer was dried in a 60° C. warm air stream for 60 seconds and then in a 100° C. warm air stream for 120 seconds, the alignment film A was prepared.

Composition of Coating Solution for Alignment Film A

| | |
|---|---|
| Polymer material for alignment film (poly(vinyl alcohol) "PVA103" manufactured by KURARAY CO., LTD.) | 4.0 parts by mass |
| Methanol | 36 parts by mass |
| Water | 60 parts by mass |

The surface of the alignment film A on the cellulose-acetate transparent support was continuously rubbed along the moving direction of the film. The rubbed surface was coated with a coating solution for an optically anisotropic layer (having a composition shown below) with a bar coater. The film was then aged at 60° C. for 60 seconds, and was irradiated with ultraviolet rays in air, with an air-cooled metal halide lamp (manufactured by EYE GRAPHICS CO., LTD.) having a luminance of 20 mW/cm² to fix the alignment state. This process produced a retardation layer of the first compensation film. In the retardation layer of the first compensation film, rod-like liquid crystal molecules were horizontally aligned such that the slow axis was parallel with the rubbing direction. The retardation layer had a thickness of 1.0 μm. The dependence of the retardation Re on the light incident angle and the tilt angle of the optical axis were measured with an automatic birefringence analyzer "KOBRA-21ADH" (manufactured by Oji Scientific Instruments). The measurement revealed that the retardation layer had a retardation Re of 100 nm and a retardation Rth of 50 nm at a wavelength of 550 nm, and the optical axis tilted by 2°.

First compensation films having various tilt angles θ were prepared from coating solutions for the retardation layer containing different amounts of a fluorine-containing compound B. First compensation films having various retardations Re and Rth were also prepared from different thicknesses of coating.

Composition of Coating Solution A for Retardation Layer

| | |
|---|---|
| Rod-like liquid crystal compound 1 | 90 parts by mass |
| Rod-like liquid crystal compound 2 | 10 parts by mass |
| Photopolymerization initiator "Irgacure-907" (manufactured by BASF) | 3.0 parts by mass |
| Sensitizer "Kayacure-DETX" (manufactured by Nippon Kayaku Co., Ltd.) | 1.0 part by mass |
| Fluorine-containing compound A | 0.5 part by mass |
| Fluorine-containing compound B | 0 to 0.02 part by mass |
| Methyl ethyl ketone | 400 parts by mass |

Rod-like liquid crystal compound 1

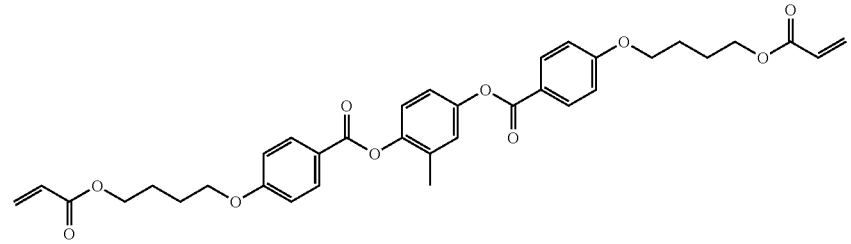 [SMILES: C=CC(=O)OCCCCOc1ccc(C(=O)Oc2ccc(OC(=O)c3ccc(OCCCCOC(=O)C=C)cc3)c(C)c2)cc1]

Rod-like liquid crystal compound 2

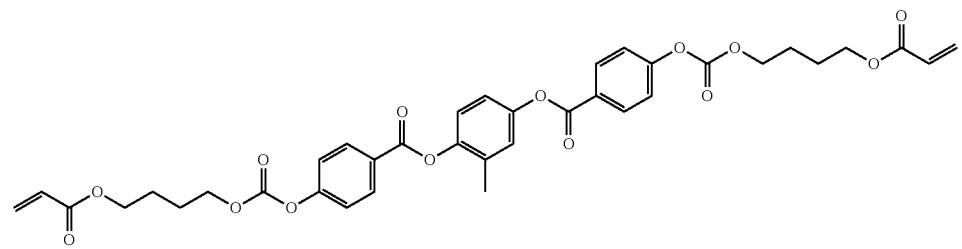 [SMILES: C=CC(=O)OCCCCOC(=O)Oc1ccc(C(=O)Oc2ccc(OC(=O)c3ccc(OC(=O)OCCCCOC(=O)C=C)cc3)c(C)c2)cc1]

Fluorine-containing compound A

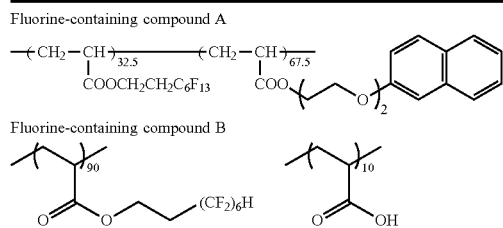

Fluorine-containing compound B

<Preparation of Second Compensation Film>
<<Fabrication of Single-Layer Second Compensation Film (Example 6 and Comparative Example 4)>>
(1) Preparation of Dope
Cellulose Acylate Solution A
The materials listed below were stirred to be dissolved in a mixing tank, were heated at 90° C. for approximately ten minutes, and then were filtered through a filter paper having an average pore diameter of 34 μm and a sintered metal filter having an average pore diameter of 10 μm.
Cellulose Acylate Solution A

| | |
|---|---|
| Cellulose acylate (degrees of substitution - benzoyl group: 0.86/acetyl group: 1.76) | 100.0 parts by mass |
| Dichloromethane | 462.0 parts by mass |

(2) Casting for Film Formation
The dope was cast with a metal band-casting machine and was dried. The resulting film was then peeled from a band with a peeling drum. This process produced an unstretched film.
(3) Stretching
The resulting unstretched film was uniaxially stretched by 10% in the moving direction (MD) of the film while maintaining the width of the film, in a tenter zone kept so that (the glass transition temperature Tg)–(the stretching temperature)=–5° C. The film was then uniaxially stretched by 65% in the transverse direction (TD) while maintaining the length in the moving direction of the film in the tenter zone kept at the same temperature. This biaxial stretching process yielded a cellulose acylate film. The thickness of the cast dope was adjusted such that the film after the stretching and drying processes had a thickness of 60 μm.
The measurement of the optical characteristics revealed that the film had a retardation Re of 250 nm and a retardation Rth of 10 nm.
The above processes produced second compensation films according to Example 6 and Comparative Example 4.
<<Fabrication of Double-Layer Second Compensation Film>>
(1) Fabrication of Second Compensation Film Including a B-Plate and a Positive C-Plate (Examples 1-5 and Comparative Examples 1-3)
Fabrication of B-plate
The materials listed below were stirred to be dissolved in a mixing tank, to prepare a cellulose acylate solution B.
Cellulose Acylate Solution B

| | |
|---|---|
| Cellulose acetate (degree of substitution: 2.46) | 100.0 parts by mass |
| Compound A *1 | 19.0 parts by mass |
| Methylene chloride | 365.5 parts by mass |
| Methanol | 54.6 parts by mass |

*1: The compound A is a copolymer of terephthalic acid, succinic acid, propylene glycol, and ethylene glycol (comonomer ratio [mol %] = 27.5:22.5:25:25).

Cellulose Acylate Solution C for Skin Layer
The materials listed below were stirred to be dissolved in a mixing tank, to prepare a cellulose acylate solution C.
Cellulose Acylate Solution C

| | |
|---|---|
| Cellulose acetate (degree of substitution: 2.79) | 100.0 parts by mass |
| Compound A *1 | 11.0 parts by mass |
| Silica microparticles "R972" (manufactured by Nippon Aerosil Co., Ltd.) | 0.15 part by mass |
| Methylene chloride | 395.0 parts by mass |
| Methanol | 59.0 parts by mass |

*1: The compound A is a copolymer of terephthalic acid, succinic acid, propylene glycol, and ethylene glycol (comonomer ratio [mol %] = 27.5:22.5:25:25).

The cellulose acylate solution B was cast into a core layer having a thickness of 90 μm, while the cellulose acylate solution C was cast into skin layers A and B each having a thickness of 2 μm.
The resulting web (film) was peeled from the band, was dried, and then was rolled. The mass percentage of the residual solvent to the entire film was 0% to 0.5%. The film was unrolled and stretched by 75% in the TD at 190° C. with a tenter. This process yielded a retardation layer 1 of the second compensation film according to Example 1. The measurement of the optical characteristics revealed that the layer had a retardation Re of 100 nm and a retardation Rth of 100 nm.
The films according to Examples 2-5 and Comparative Examples 1-3 were fabricated through the same processes.
Fabrication of Positive C-Plate
The surface of the resulting B-plate was saponified and was laminated with a vertical alignment film "JALS-204R" (commercially available from JSR Corporation), which was diluted to 1:1 with methyl ethyl ketone, into a density of 2.4 ml/m² with a wire bar coater. The B-plate was then immediately dried in a 120° C. warm air stream for 120 seconds.
The rod-like liquid crystal compound 2 (3.8 g), the photopolymerization initiator "Irgacure-907" (manufactured by Ciba-Geigy AG; 0.06 g), the sensitizer "Kayacure-DETX" (manufactured by Nippon Kayaku Co., Ltd.; 0.02 g), and an aligning agent for the air interface (shown below; 0.002 g) were dissolved in methyl ethyl ketone (9.2 g). The resulting solution was applied onto the alignment film on the B-plate with a wire bar #3.4. The resulting film was attached to a metal frame, and was heated in a thermostatic chamber kept at 100° C. for two minutes, to align rod-like liquid crystal molecules. The film was then irradiated with ultraviolet rays at 80° C. for 20 seconds with a high-pressure mercury-vapor lamp having an output of 120 W/cm, to crosslink the rod-like liquid crystal molecules. The film was spontaneously cooled to room temperature, to prepare a retardation layer.

Aligning Agent for the Air Interface:
Compound (II-4) disclosed in Japanese Unexamined Patent Application Publication No. 2003-119959

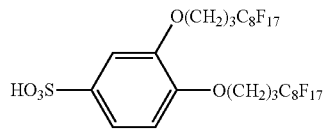

The dependence of the retardation Re on the light incident angle in the resulting film was measured with the automatic birefringence analyzer "KOBRA-21ADH" (manufactured by Oji Scientific Instruments). The preliminarily determined retardation of the support was subtracted from the measured result to obtain the optical characteristics of the coated layer alone. The calculation revealed that the layer had a retardation Re of 0 nm and a retardation Rth of −155 nm, which data indicates rod-like liquid crystal molecules in a substantially vertical alignment. This process produced a retardation layer 2 of the second compensation film according to Example 1.

Second compensation films according to Examples 2-5 and Comparative Examples 1-3 were fabricated through the same processes.

(2) Fabrication of Second Compensation Film Including B-Plate and Negative C-Plate (Example 7 and Comparative Example 5)

Fabrication of B-Plate

The film was peeled from a polarizing plate detached from a liquid crystal television "42Z1" (manufactured by TOSHIBA CORPORATION). The dependence of the retardation Re on the light incident angle was measured with the automatic birefringence analyzer "KOBRA-21ADH" (manufactured by Oji Scientific Instruments). The measurement revealed that the film had a retardation Re of 110 nm and a retardation Rth of −100 nm.

Fabrication of Negative C-Plate

The materials listed below were stirred to be dissolved in a mixing tank, were heated at 90° C. for approximately ten minutes, and then were filtered through a filter paper having an average pore diameter of 34 μm and a sintered metal filter having an average pore diameter of 10 μm.

Cellulose Acetate Solution D

| | |
|---|---|
| Cellulose acetate (degree of substitution: 2.79) | 100.0 parts by mass |
| Polycondensation ester PB-35 | 9.0 parts by mass |
| Compound 1 | 0-10 parts by mass |
| Dichloromethane | 403.0 parts by mass |
| Methanol | 60.2 parts by mass |

Polycondensation ester PB-35:

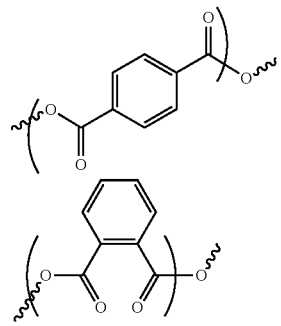

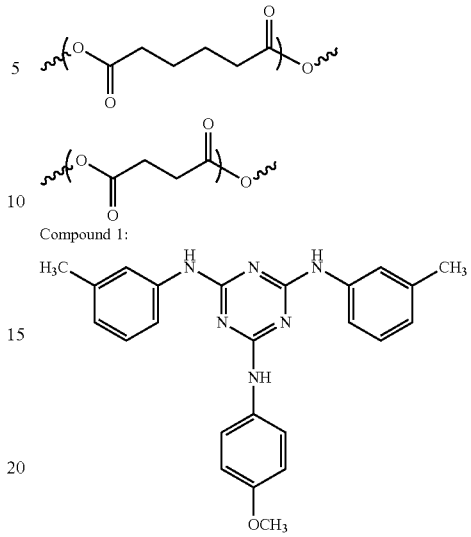

Compound 1:

The polymer dope kept at 36° C. was cast onto a stainless-steel band at a controlled flow rate from a die outlet, such that the resulting polymer film had a thickness of 58 μm. After drying and peeling processes, the retardation in plane Re of the resulting film was measured at a wavelength of 550 nm through three-dimensional measurement of birefringence with an automatic birefringence analyzer "KOBRA-WR" (manufactured by Oji Scientific Instruments). The measurement revealed that the film had a retardation Re of 0 nm and a retardation Rth of 110 nm.

The B-plate was bonded to the negative C-plate with an acrylic adhesive, to prepare a second compensation film.

<Fabrication of Polarizing Plate>

The surface of the support of the film "TD80UL" (manufactured by FUJIFILM Corporation; Re(550)=0 nm, Rth (550)=40 nm) was alkali-saponified. The film was immersed in 1.5 N aqueous sodium hydroxide at 55° C. for two minutes, was washed in a water bath at room temperature, and was neutralized with 0.1 N sulfuric acid at 30° C. The film was then washed in a water bath at room temperature again, and was dried in a 100° C. warm air stream. A rolled poly(vinyl alcohol) film having a thickness of 80 μm was continuously stretched by five times in aqueous iodine and was dried, to yield a polarizer having a thickness of 20 μm.

The other surface of the polarizer was bonded to the compensation film prepared as described above, to prepare a polarizing plate including the film TD80UL and the compensation film sandwiching and protecting the polarizer. The films were bonded to each other with an aqueous poly(vinyl alcohol) adhesive solution. In the first compensation film or the single-layer second compensation film, the slow axis of the compensation film was parallel with the absorption axis of the polarizer. In the double-layer second compensation film containing the positive C-plate, the slow axis of the B-plate was orthogonal to the absorption axis of the polarizer and the B-plate was adjacent to the polarizer. In the double-layer second compensation film containing the negative C-plate, the slow axis of the B-plate was parallel with the absorption axis of the polarizer and the B-plate was adjacent to the polarizer.

<Fabrication of Liquid Crystal Display Device>

An IPS-mode liquid crystal cell was prepared by removing polarizing plates from both surfaces of a liquid crystal cell of a device "iPad" (manufactured by Apple Inc.). The liquid crystal cell had a retardation Δn·d of 350 nm and a pretilt angle θ of 2.0°. The liquid crystal molecules were driven in a dual domain mode.

The angle ϕ was measured with a polarimeter "Axo Scan" (manufactured by Axo Metrics) through measurement of the angle of the slow axis of the liquid crystal cell during voltage application. The angles of the slow axis of the liquid crystal were measured in modes of displaying individual halftone colors, expressed in 256 steps (0-255) between black and white. The measurement revealed that the slow axis had an angle ϕ of 1° at fifth gray level, 2° at 15th gray level, and 5° at 30th gray level.

According to the embodiment illustrated in FIGS. 1 and 2, the first polarizer, the liquid crystal cell, and the polarizing plate containing the second compensation film were laminated in sequence, to prepare a liquid crystal display device in Example 1. As viewed perpendicularly to the substrate of the liquid crystal cell, the absorption axis of the polarizing plate containing the first compensation film was parallel with the optical axis of the first compensation film. The optical axis of the first compensation film was tilted at a tilt angle shown in Table 1 from the substrate of the liquid crystal cell. The optical axis of the liquid crystal layer in the cell and the optical axis of the first compensation film were tilted in the same direction. Liquid crystal display devices in the other examples and comparative examples were also prepared according to the embodiment illustrated in FIGS. 1 and 2 or FIGS. 3 and 4 (refer to Table 1) through the same processes except for modifications on the first compensation film and/or the second compensation film.

<Evaluation>

The display performance was measured with an instrument "Ezcom" (commercially available from ELDIM) for measuring the viewing angle and chromatic characteristics of a liquid crystal. A backlight used was one included in a commercially available liquid crystal display device "iPad" (manufactured by Apple Inc.). The liquid crystal cell was laminated with the polarizing plates, such that the first compensation film was adjacent to the backlight in Examples 1, 2, and 4-7 and Comparative Examples 1-3, or the first compensation film was distant from the backlight in Example 3. The liquid crystal was evaluated in a mode of displaying a halftone color in a gray level shown in Table 1, among 256 steps (0-255) between black and white.

<<Color Index—Hab σ>>

At a polar angle of 60°, the standard deviation σ of the hue angle (hab) of a variation in halftone colors (by an azimuth of 5°) in the a*b* plane was calculated. A larger value σ indicates a larger variation in colors. The calculated value was evaluated in the following four grades of A to D:

A: σ≤70
B: 70<σ≤80
C: 80<σ≤90
D: 90<σ

<<Color Index—Δu'v'>>

At a polar angle of 60°, the maximum width Δu'v' of a variation in halftone colors (by an azimuth of 5°) in the u'v' plane was calculated. A larger value Δu'v' indicates a larger variation in colors. The calculated value Δu'v' was evaluated in the following four grades of A to D:

A: Δu'v'≤0.08
B: 0.08<Δu'v'≤0.13
C: 0.13<Δu'v'≤0.18
D: 0.18<Δu'v'

TABLE 1

| | | Lliquid crystal cell | | First compensation film | | | Second compensation film | | Color index | |
|---|---|---|---|---|---|---|---|---|---|---|
| | Configuration | Gray levels (256 steps) | The angle ϕ | Fluorine-containing compound B | Retardation sublayer (Re/Rth) | Tilt angle θ | Retardation sublayer 1 (Re/Rth) | Retardation sublayer 2 (Re/Rth) | hab σ | Δu'v' |
| Example 1 | FIG. 1 and FIG. 2 | 5 | 1 | 0 | 100/50 | 2 | 100/100 | 0/−155 | A(58) | B(0.100) |
| Example 2 | FIG. 1 and FIG. 2 | 15 | 2 | 0 | 100/50 | 2 | 100/100 | 0/−155 | B(78) | B(0.086) |
| Example 3 | FIG. 3 and FIG. 4 | 15 | 2 | 0 | 100/50 | 2 | 100/100 | 0/−155 | B(71) | A(0.076) |
| Example 4 | FIG. 1 and FIG. 2 | 15 | 2 | 0.02 | 60/30 | 3 | 100/100 | 0/−155 | B(79) | B(0.084) |
| Example 5 | FIG. 1 and FIG. 2 | 30 | 5 | 0 | 100/50 | 2 | 100/100 | 0/−155 | C(84) | A(0.079) |
| Example 6 | FIG. 1 and FIG. 2 | 15 | 2 | 0 | 100/50 | 2 | 250/10 | — | A(67) | C(0.172) |
| Example 7 | FIG. 1 and FIG. 2 | 15 | 2 | 0 | 100/50 | 2 | 110/−100 | 0/110 | A(58) | C(0.178) |
| Comparative example 1 | FIG. 1 and FIG. 2 | 15 | 2 | — | なし | — | 100/100 | 0/−155 | D(111) | B(0.084) |
| Comparative example 2 | FIG. 1 and FIG. 2 | 30 | 5 | — | なし | — | 100/100 | 0/−155 | D(97) | A(0.071) |
| Comparative example 3 | FIG. 1 and FIG. 2 | 15 | 2 | 0 | 100/50 | −2 | 100/100 | 0/−155 | D(95) | B(0.112) |
| Comparative example 4 | FIG. 1 and FIG. 2 | 15 | 2 | — | なし | — | 250/10 | — | B(78) | D(0.207) |
| Comparative example 5 | FIG. 1 and FIG. 2 | 15 | 2 | — | なし | — | 110/−100 | 0/110 | B(73) | D(0.194) |

In Table 1, Re and Rth indicate a retardation in plane (nm) and a retardation along the thickness direction (nm), respectively, at a wavelength of 550 nm. The unit of the angle ϕ and the tilt angle θ is degree) (°). As is apparent from Table 1, the liquid crystal display device according to the invention has smaller color indexes hab σ and Δu'v', i.e., has a reduced variation in colors in a halftone display mode.

<Thin Polymer Film>

Dopes P10 and T30 having respective compositions shown below were prepared.

Composition of Dope P10:

| Composition of dope P10: | |
|---|---|
| DIANAL BR88 (commercially available from Mitsubishi Rayon Co., Ltd.) | 100.0 parts by mass |

-continued

| | |
|---|---|
| Additive AA1 | 5.8 parts by mass |
| Additive AA2 | 1.8 parts by mass |
| Additive UU1 | 2.0 parts by mass |
| Composition of dope T30: | |
| Cellulose acylate (degree of substitution: 2.42) | 100.0 parts by mass |
| Additive AA1 | 5.8 parts by mass |
| Additive AA2 | 1.8 parts by mass |
| Additive UU1 | 2.0 parts by mass |

The additive AA1 is represented by the following structural formula, where R indicates a benzoyl group (average degree of substitution: 5 to 7):

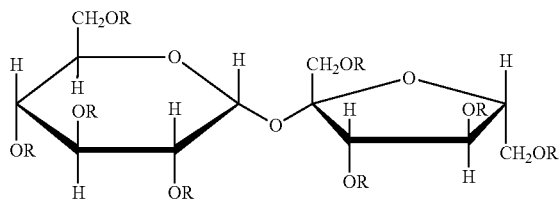

The additive AA2 is represented by the formula on the left below, and the structural formulae and degrees of substitution of groups $R^9$ are represented on the right below:

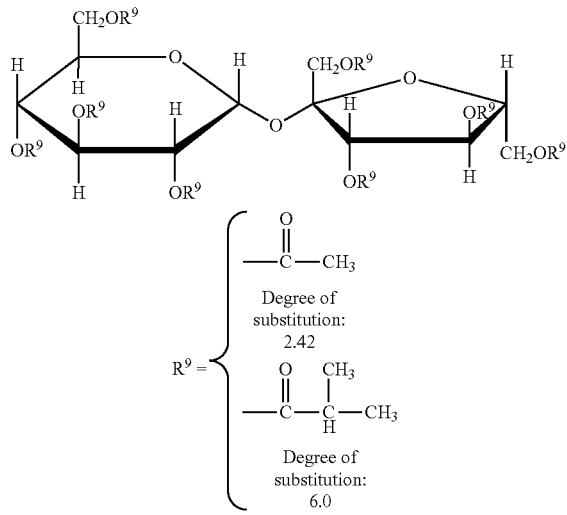

The additive UU1 is represented by the following formula:

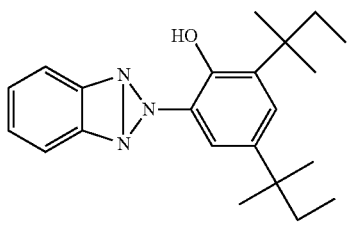

A laminated film was fabricated through solution casting with the dopes P10 and T30. In specific, the two dopes were cast onto a metal support with a T-die for triple-layer co-casting. The laminated film had a bottom layer of the dope T30, an intermediate layer of the dope P10, and a top layer of the dope T30, in order from the metal support. The viscosity of each layer was properly adjusted by controlling the solid content depending on the combination of the dopes, to achieve uniform co-casting. The dopes were dried in a 40° C. dry air stream on the metal support to form a film. The resulting film was peeled from the support, was fixed with pins on both edges, and was dried in a 105° C. dry air stream for five minutes while the pins were maintaining a constant interval therebetween. After removal of the pins, the laminated film was further dried at 130° C. for 20 minutes, and was rolled up.

The three layers of the film were then peeled from one another. The bottom layer had a thickness of 20 μm. This process stably yielded a thin polymer film.

The resulting thin film was substituted for the film TD80UL included in the polarizing plate, to constitute a liquid crystal display device having the same configuration. The resulting liquid crystal display device was evaluated as described above, and determined to be excellent like the above-described examples.

<Thin Polarizing Film>

In accordance with a technique disclosed in Japanese Patent No. 4804588, a thin polarizing film was fabricated as explained below. An amorphous-ester thermoplastic resin base consisting of a copolymer of isophthalic acid and poly(ethyleneterephthalate) (comonomer content of isophthalic acid: 6 mol %) was prepared. The resin base was coated with a PVA resin layer. The resin base and the PVA resin layer were stretched together through two-step stretching processes of auxiliary stretching in air and stretching in boric-acid solution. The PVA resin layer was stained with dichroic pigment. This process produced a polarizing film having a thickness of 3 μm. A liquid crystal display device including the resulting polarizing film was evaluated as described above, and determined to be excellent like the above-described examples.

The present disclosure relates to the subject matter contained in Japanese Patent Application No. 2013-160485 filed on Aug. 1, 2013, which is expressly incorporated herein by reference in their entirety. All the publications referred to in the present specification are also expressly incorporated herein by reference in their entirety.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

What is claimed is:
1. A liquid crystal display device comprising, in sequence:
a first polarizer;
a liquid crystal cell comprising a liquid crystal layer containing liquid crystal molecules aligned in parallel with a substrate of the liquid crystal cell; and a second polarizer, the liquid crystal display device further comprising a first compensation film between the first polarizer and the liquid crystal cell, or between the liquid crystal cell and the second polarizer, wherein as viewed perpendicularly to the substrate of the liquid crystal cell, an absorption axis of the first polarizer is parallel with an optical axis of the first compensation film, and an angle φ between the absorption axis of the first polarizer and an optical axis of the liquid crystal layer in the liquid crystal cell satisfies 0°<φ, wherein in a cross section of the liquid crystal cell as viewed along a transmission axis of the first polarizer, an optical axis of the liquid crystal layer in the liquid crystal cell and the optical axis of the first compensation film have a tilt angle in the same direction to a face of the substrate of the liquid crystal cell, wherein the first compensation film has a positive birefringence, and wherein the angle φ between the absorption axis of the first polarizer and an optical axis of the liquid crystal layer in the liquid crystal cell is within a range of 0°<φ≤45°.

2. The liquid crystal display device according to claim 1, wherein the liquid crystal layer in the liquid crystal cell has regions having an optical axis deviating rightward from the absorption axis of the first polarizer and regions having an optical axis deviating leftward from the absorption axis of the first polarizer, as viewed perpendicularly to the substrate of the liquid crystal cell.

3. The liquid crystal display device according to claim 2, wherein the tilt angle defined by the optical axis of the first compensation film and the face of the substrate of the liquid crystal cell is 1° to 20°.

4. The liquid crystal display device according to claim 2, wherein the first compensation film has a retardation Re(550) of 20 to 300 nm and a value Nz (Nz =Rth(550)/Re(550)+0.5) of 0.9 to 1.1, where Re(550) is a retardation in plane (nm) at a wavelength of 550 nm, and Rth(550) is a retardation along the thickness direction (nm) at a wavelength of 550 nm.

5. The liquid crystal display device according to claim 1, wherein the tilt angle defined by the optical axis of the first compensation film and the face of the substrate of the liquid crystal cell is 1° to 20°.

6. The liquid crystal display device according to claim 1, wherein the first compensation film has a retardation Re(550) of 20 to 300 nm and a value Nz (Nz =Rth(550)/Re(550)+0.5) of 0.9 to 1.1, where Re(550) is a retardation in plane (nm) at a wavelength of 550 nm, and Rth(550) is a retardation along the thickness direction (nm) at a wavelength of 550 nm.

7. The liquid crystal display device according to claim 1, wherein the first compensation film satisfies the following condition;

$Re(450)/Re(550) \leq 1.2$ $Rth(450)/Rth(550) \leq 1.2$ where Re(450) and Re(550) are a retardation in plane (nm) at a wavelength of 450 nm and 550 nm, and Rth(450) and Rth(550) are a retardation along the thickness direction (nm) at a wavelength of 450 nm and 550 nm.

8. The liquid crystal display device according to claim 1, wherein the first compensation film satisfies the following condition;

$Re(450)/Re(550) \leq 0.9$ $Rth(450)/Rth(550) \leq 0.9$ where Re(450) and Re(550) are a retardation in plane (nm) at a wavelength of 450 nm and 550 nm, and Rth(450) and Rth(550) are a retardation along the thickness direction (nm) at a wavelength of 450 nm and 550 nm.

9. The liquid crystal display device according to claim 1, further comprising:

a second compensation film in the second polarizer adjacent to the liquid crystal cell, wherein at least one of the first compensation film and the second compensation film is a polymer film.

10. The liquid crystal display device according to claim 9, wherein the polymer film is selected from cellulose acylate film, cyclic olefin polymer film, and acrylic polymer film.

11. The liquid crystal display device according to claim 9, wherein the polymer film has a thickness of 1 to 90 μm.

12. The liquid crystal display device according to claim 10, wherein the acrylic polymer film contains an acrylic polymer having at least one unit selected from a lactone ring unit, a maleic anhydride unit, and a glutaric anhydride unit.

13. The liquid crystal display device according to claim 1, further comprising:

a second compensation film in the second polarizer adjacent to the liquid crystal cell, wherein at least one of the first compensation film and the second compensation film is a polarizing plate sandwiched between a compensation film and a protective film in the polarizing plate.

14. The liquid crystal display device according to claim 13, wherein the protective film has a thickness of 10 to 80 μm.

15. The liquid crystal display device according to claim 1, wherein the first and second polarizers each have a thickness of 50 μm or smaller.

* * * * *